United States Patent
Kato

(10) Patent No.: US 6,529,523 B1
(45) Date of Patent: Mar. 4, 2003

(54) CONVERTING CIRCUITS AND BANDWIDTH MANAGEMENT APPARATUS IN MIXED NETWORK

(75) Inventor: Yoshiharu Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/130,159

(22) Filed: Aug. 6, 1998

(30) Foreign Application Priority Data

Dec. 26, 1997 (JP) .............................................. 9-359704

(51) Int. Cl.⁷ .............................................. H04L 12/66
(52) U.S. Cl. ........................................ 370/466; 370/356
(58) Field of Search ................................. 370/466, 352, 370/353, 354, 355, 356, 395, 366, 372, 376, 382, 375, 378, 379, 474

(56) References Cited

U.S. PATENT DOCUMENTS

| | | | | |
|---|---|---|---|---|
| 5,204,857 A | * | 4/1993 | Obara .......................... | 370/354 |
| 5,274,635 A | * | 12/1993 | Rahmam ..................... | 370/352 |
| 5,341,376 A | * | 8/1994 | Yamashita .................... | 370/466 |
| 5,365,521 A | * | 11/1994 | Ohnishi et al. .............. | 370/352 |
| 5,412,655 A | * | 5/1995 | Yamada et al. .............. | 370/474 |
| 5,428,609 A | * | 6/1995 | Eng et al. ..................... | 370/392 |
| 5,742,600 A | * | 4/1998 | Nishihara ..................... | 370/395 |
| 5,764,637 A | * | 6/1998 | Nishihara ..................... | 370/397 |
| 5,953,338 A | * | 9/1999 | Ma et al. ...................... | 370/395 |
| 6,009,100 A | * | 12/1999 | Gausmann et al. .......... | 370/397 |
| 6,125,117 A | * | 9/2000 | Martin et al. ................ | 370/397 |
| 6,324,174 B2 | * | 11/2001 | Bharucha et al ............ | 370/352 |

* cited by examiner

Primary Examiner—Ken Vanderpuye
(74) Attorney, Agent, or Firm—Katten Muchin Zavis Rosenman

(57) ABSTRACT

The sending/receiving unit of an STM switch is provided with a converting circuit for converting time division multiplexed frames of an STM network to cells of an ATM network and a converting circuit for converting cells of an ATM network to time division multiplexed frames of an STM network. The STM switch time division multiplexes data from terminals, converts the time division multiplexed frame to cells and sends the cells to an ATM switch. Cells switched by an ATM switch and sent to the STM switch are converted to time division multiplexed frames by the STM switch, whence the frames are sent to prescribed terminals.

6 Claims, 17 Drawing Sheets

CONVERTING CIRCUITS AND BANDWIDTH MANAGEMENT APPARATUS IN MIXED NETWORK

BACKGROUND OF THE INVENTION

This invention relates to a converting circuit and bandwidth management apparatus in a mixed network obtained by mixing an STM and ATM networks. More particularly, the invention relates to a converting circuit for converting time division multiplexed frames to ATM cells or ATM cells to time division multiplexed frames, and to an ATM switch bandwidth management apparatus for managing the bandwidth of STM calls.

Recent progress in ATM (Asynchronous Transfer Mode) technology has been remarkable and some ATM switch networks have been constructed. Nevertheless, replacing all presently existing STM (Synchronous Transfer Mode) switch networks is not possible because of the costs involved and, for the time being, STM and ATM networks will continue to be used together. However, there is little doubt that use of ATM, which is advantageous in terms of transferring large quantities of data, will gradually increase and that ATM will become the mainstay of switching networks. A problem encountered when two types of networks, namely STM and ATM switch networks, are used together is that dual transmission lines must be provided. This is wasteful of equipment. Accordingly, an important problem to be solved in the future involves a method of sending data from an STM network to an ATM network and vice versa.

FIG. 17 shows an example of a time division multiplexed frame used in an STM network. This is an example in which one frame period T has been partitioned into n (e.g., 64) time slots TS1~TS64. Here a maximum of 64 channels of data can be time division multiplexed into the time slots TS1~TS64. Twenty frames construct a subframe. Each item of channel data is composed of eight bits (one byte) and has a bit rate of 8×8 K=64 (Kbps) per time slot, where 8 KHz is associated with one frame.

FIG. 18 is a diagram useful in describing the format of a cell in an ATM network An ATM cell is composed of a 5-byte cell header HD and a 48-byte payload PLD. The header HD includes (1) a generic flow control (GFC) used in flow control between links, (2) a virtual path identifier (VPI) for specifying a path, (3) a virtual channel identifier (VCI) for call identifying purposes, (4) payload type (PT), (5) cell loss priority CLP and (6) header error control (HEC).

With the proliferation of ATM networks, it has become essential to be able to access an ATM network from an ATM network and vice versa, and therefore an arrangement through which such mutual access can be performed is necessary. For example, if an STM network is to send data to an ATM network, the time division multiplexed frames of FIG. 17 must be converted to ATM cells of the kind shown in FIG. 18. If an ATM network is to send data to an STM network, then ATM cells must be converted to time division multiplexed frames.

Furthermore, it is required that cells output from an STM switch satisfy a 64-Kbps data bandwidth, which is a feature of an STM network. Accordingly, in an ATM network, basically it is required to establish a path based upon a 64-Kbps CBR (Constant Bit Rate), to arrange it so that the CTD (Cell Transfer Delay) in the ATM switch is small and to absorb cell fluctuation.

Further, an important factor in bandwidth control, which is a feature of an ATM switch, is to arrange it so that there is no change even if an STM switch is accommodated. In other words, since QOS (Quality of Service) control of CBR (Constant Bit Rate), ABR (Available Bit Rate) and VBR (Variable Bit Rate) in an ATM switch is performed collectively within the switch, it is better that special processing for an STM switch not be executed. That is, it is so arranged that the bandwidth management algorithm of the ATM switch be employed even if there is a path connection request from the STM switch. If this arrangement is adopted, an advantage gained is that a path connection request from an STM switch can be handled in a manner equivalent to that of a path connection request from another ATM terminal.

The bandwidth used between STM switches varies depending upon traffic. For this reason, it is preferred that the path connection between STM switches be based upon an SVC (Switched Virtual Channel). However, if another ATM terminal accommodated by an ATM switch uses the entire bandwidth in a case where a path is connected by the SVC service, a CBR path will no longer be established for an STM switch. Accordingly, dedicated bandwidth is reserved for the path between STM switches and a PVC (Permanent Virtual Circuit) is established between the STM switches within the limits of the dedicated bandwidth. However, since it wasteful if dedicated bandwidth is not used, it is necessary to reduce such waste by varying dedicated bandwidth dynamically in dependence upon daily traffic.

SUMMARY OF THE INVENTION

Accordingly, a first object of the present invention is to realize a mixed network of ATM and STM networks by providing a converting circuit for converting time division multiplexed frames of an STM network to cells of an ATM network and a converting circuit for converting ATM cells to time division multiplexed frames.

A second object of the present invention is to realize a mixed network of ATM and STM networks in which fluctuation of cells in an ATM network is absorbed and a bit rate of 64 Kbps is satisfied in an ATM network.

A third object of the present invention is to realize a mixed network of ATM and STM networks adapted to minimize waste of bandwidth by varying dedicated bandwidth between STM switches dynamically in dependence upon one day of traffic of an STM switch, and to accept STM calls to the greatest extent possible.

A fourth object of the present invention is to realize a mixed network of ATM and STM networks in which when the total bandwidth of an accepted STM call exceeds the dedicated bandwidth between STM switches, decides whether or not to accept an STM call based upon whether or not any surplus bandwidth remains (i.e., bandwidth other than the dedicated bandwidth).

According to the present invention, the first object is attained by,providing a converting circuit for converting a time division multiplexed frame of an STM network, which frame is the result of time division multiplexing n channels in one frame and one byte of data in each channel, to cells of an ATM network, each cell having a header and an m-byte payload, comprising (1) a time switch memory having, for each destination STM switch, a storage area possessing m consecutive addresses, (2) a control memory for storing a corresponding relationship between time slot numbers in a time division multiplexed frame and addresses of the time switch memory, (3) means for writing data of each time slot in the time division multiplexed frame to a storage area of the time switch memory that is specified by the corresponding relationship stored in the control memory, (4) a buffer memory for storing data read out of the time switch memory, (5) means for reading data out of the time switch memory successively, storing the data in the buffer memory and reading the data out of the buffer memory successively in m-byte units, and (6) cell generating means for generating a cell in which m bytes of consecutive data read out of the buffer memory is adopted as a payload and a header having an identifier conforming to a destination STM switch is added onto the payload. Thus, the converting circuit makes it possible to convert a time division multiplexed frame to cells.

According to the present invention, the first object is attained by providing a converting circuit for converting a time division multiplexed frame of an STM network, which frame is the result of time division multiplexing n channels in one frame and one byte of data in each channel, to cells of an ATM network, each cell having a header and an m-byte payload, comprising (1) a destination memory for storing correspondence between time slot numbers of a time division multiplexed frame and STM switches that are destinations, (2) a destination add-on unit for adding onto data in the time slots of the time division multiplexed frame the destinations of the corresponding time slots that have been stored in the destination memory, (3) a routing unit, to which the time division multiplexed frame having the added-on destinations is input, for disassembling the data of the frame on a per-address basis and outputting the disassembled data, (4) a buffer, which is provided for each destination, for storing the disassembled data output by the routing unit, and (5) cell generating means for generating a cell in which m-byte data read out of each buffer in consecutive fashion is adopted as a payload and a header having an identifier conforming to a destination is added onto the payload. Thus, the converting circuit makes it possible to convert a time division multiplexed frame to cells.

According to the present invention, the first object is attained by providing a converting circuit for converting ATM network cells each having a header and an m-byte payload to time division multiplexed frames of an STM network, wherein one frame is composed of n channels and each channel is composed of one byte, comprising (1) a buffer for storing m bytes of payload data, which construct the payload of a received cell, in such a manner that a cell number and a payload number are capable of being identified, (2) a time switch memory in which time slot numbers serve as addresses, (3) a control memory for storing correspondence between combinations of cell numbers and payload numbers and addresses of the time switch memory, (4) writing means for identifying cell number and payload number of payload data that has been read out of the buffer, obtaining from the control memory an address that corresponds to a combination of the cell number and payload number and writing this payload data to a storage area of the time switch memory that is specified by this address, and (5) means for reading data out of the time switch memory consecutively in the order of the time slot numbers and converting the data to a time division multiplexed frame. Thus, the converting circuit makes it possible to convert a time division multiplexed frame to cells.

According to the present invention, the second object is attained by arranging it so that payload data of a plurality of received cells can be stored in the buffer, providing readout timing management means for managing timing at which the payload data of each cell is read out of the buffer, and reading prescribed payload data out of the buffer at the readout timing.

According to the present invention, the third object is attained by providing a bandwidth management apparatus of an ATM switch in a mixed network of STM and ATM networks, comprising means for establishing a PVC of a prescribed bandwidth between each of the STM switches in advance, means for monitoring traffic between the STM switches, and PVC bandwidth adjusting means for adjusting the bandwidth of the PVC in dependence upon the traffic between the STM switches. Thus, in accordance with the bandwidth management apparatus of the present invention, the PVC bandwidth between STM switches can be varied dynamically in dependence upon one day of STM switch traffic. As a result, wasting of bandwidth can be minimized and STM calls can be accepted to the maximum extent possible.

According to the present invention, the fourth object is attained by providing a bandwidth management apparatus of an ATM switch having means for accepting a call in response to a call establishment request from an STM switch if the PVC bandwidth has enough margin, checking bandwidth other than the PVC bandwidth if the PVC bandwidth has insufficient margin, accepting the call if the bandwidth other than the PVC bandwidth has enough margin and refusing the call if the bandwidth other than the PVC bandwidth has insufficient margin. If this arrangement is adopted, an ATM bandwidth management algorithm is applied even in response to a path connection request from an STM switch, whereby a path connection request from an STM switch can be handled in a manner equivalent to that of a path connection request from another ATM terminal.

Other features and advantages of the present invention will be apparent from the following description taken in conjunction with the accompanying drawings.

DESCRIPTION OF THE PREFERRED EMBODIMENTS

(A) System Configuration

Figure 1:
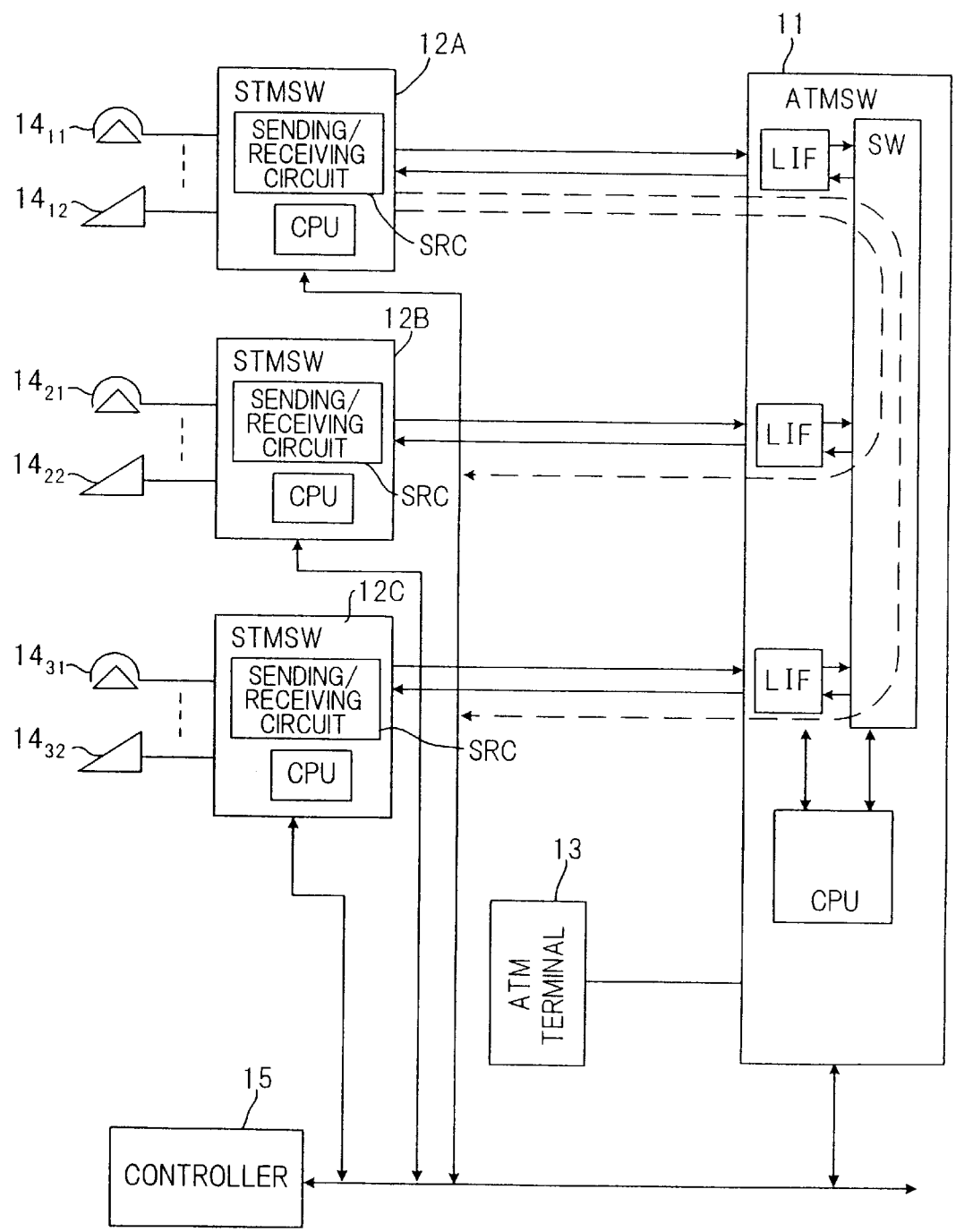
FIG. 1 is a diagram showing the configuration of a system according to the present invention.
Figure 2:
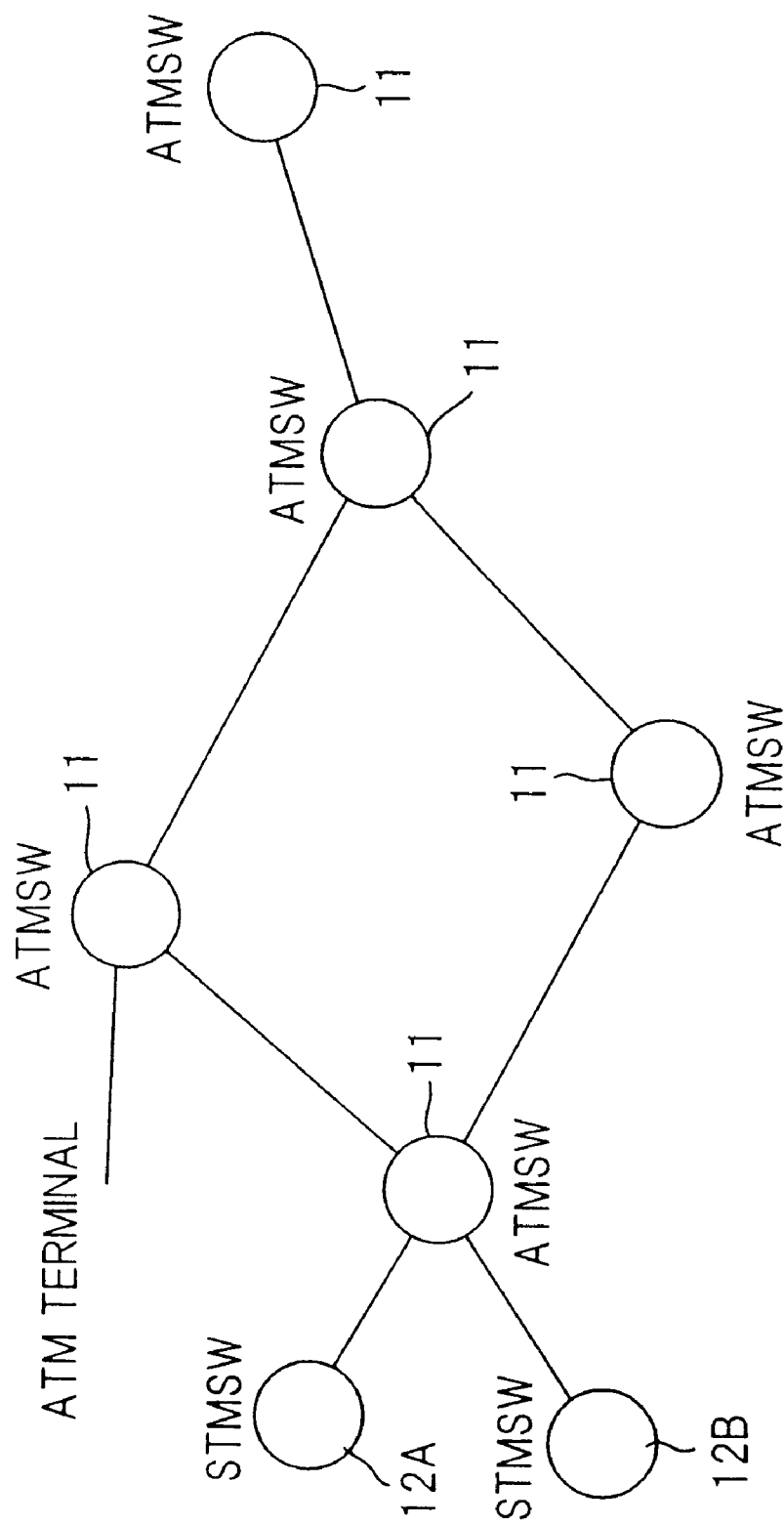
FIG. 2 is a diagram showing a mixed network composed of STM and ATM networks.

FIG. 1 is a diagram showing the configuration of a system which includes STM switches and an ATM switch, and FIG. 2 is a diagram showing an example of a mixed network of STM and ATM networks. More specifically, shown are an ATM switch (ATM SW) 11, STM switches (STM SW) 12A~12C, an ATM terminal 13, terminals $14_{11}$~$14_{32}$ of analog or digital telephones accommodated by the STM switches, and a controller (system management processor) 15 for controlling the overall system by communicating with CPUs of the ATM switches and STM switches. As shown in FIG. 1, the ATM switch 11 has line interfaces LIF, a multiplexer/demultiplexer (not shown), a switch SW and a processor CPU for controlling each of these units. Each of the STM switches 12A~12C has a sending/receiving circuit SRC and a processor CPU, etc. The sending/receiving circuit SRC (1) time-division multiplexes data from each of the terminals, (2) converts the time division multiplexed frames to cells and sends the cells to the ATM switch, (3) receives cells from the ATM switch and converts the cells to time division multiplexed frames, and (4) sends the data of prescribed time slots to the terminals.

The ATM switch 11 accommodates the three STM switches 12A~12C and the ATM terminal 13. The ATM terminal 13 is capable of being accommodated by the ATM switch as in the prior art. Since the STM switches 12A~12C are each constructed to convert time division multiplexed frames to cells and input the cells to the ATM switch 11, the STM switches are capable of being accommodated by the ATM switch. The STM switches 12A~12C are capable of being connected to each other by paths within the ATM switch. Destination STM switches as seen from the STM switch 12A are the switches 12B and 12C, destination STM switches as seen from the STM switch 12B are the switches 12C and 12A, and destination STM switches as seen from the STM switch 12C are the switches 12A and 12B.

It is possible for the paths between the STM switches 12A~12C to be established by a PVC (Permanent Virtual Circuit) service of a prescribed bandwidth and by an SVC (Switched Virtual Circuit) service as well. It should be noted that in a case where all paths have been established by the PVC service, the bandwidth within the ATM switch 11 cannot be controlled based upon the traffic of the STM switches. Accordingly, in a situation where paths are established by the PVC service within a prescribed bandwidth and a bandwidth greater than these bandwidths is required, it is so arranged that the paths are established by the SVC service. Furthermore, since it is required that these paths satisfy the data bandwidth of 64 Kbps, which is a feature of an STM network, basically paths based upon the CBR are established and the CTD (Cell Transfer Delay) with in the ATM switch is reduced.

(B) Converting Circuit for Converting Time Division Multiplexed Frames to Cells

(a) Overview

In an STM network, 64-Kbps data is managed by a time-slot format. In an ATM network, on the other hand, data is managed by a cell format in which a cell is composed of a 5-bit header and a 48-byte payload. Accordingly, transmission to an ATM switch from an STM switch cannot be achieved unless the time slot data is converted to cell data. For example, in order to connect STM switch 12A to STM switch 12B or STM switch 12C to establish communication, a path must be connected from STM switch 12A to STM switch 12B or STM switch 12C, the time slot data must be converted to cell data and the cells obtained must be transmitted. In this case, since one cell has a data field (payload) of 48 bytes, data of a maximum of 48 time slots can be mapped to the payload of one cell.

An overview of an arrangement for converting time division multiplexed data to a cell format will now be described with reference to FIG. 3. A more detailed description will be given later.

First, time slot data to be transmitted is partitioned according to each destination STM switch and is then written randomly to storage areas 32B, 32C, which correspond to the destination STM switches, in a time switch memory 32. Since the payload of one cell corresponds to 48 time slots, the time switch memory 32 has 48 boundaries and the storage areas 32B, 32C are each composed of 48 bytes. Data having the same destination is managed for every boundary (i.e., for each of the storage areas 32B, 32C) to generate payloads. Finally, cells are generated by adding headers having identical destinations onto the payloads, and the cells are transmitted.

Though the readout of data from the time switch memory 32 is performed sequentially, the clock within an STM switch and the clock within an ATM switch have different frequencies. Accordingly, the data is temporarily written to a FIFO buffer 38. When the data is read out of the FIFO buffer 38, the header is inserted to produce the cell. The destination of an STM switch is specified by the VPI or VPI/VCI of the header. Further, a cell number is added in the same manner in order to identify the cell. As a result, even if a cell is lost because of failure of some kind, the fact that the failure occurred can be recognized.

(b) First Embodiment

Figure 3:
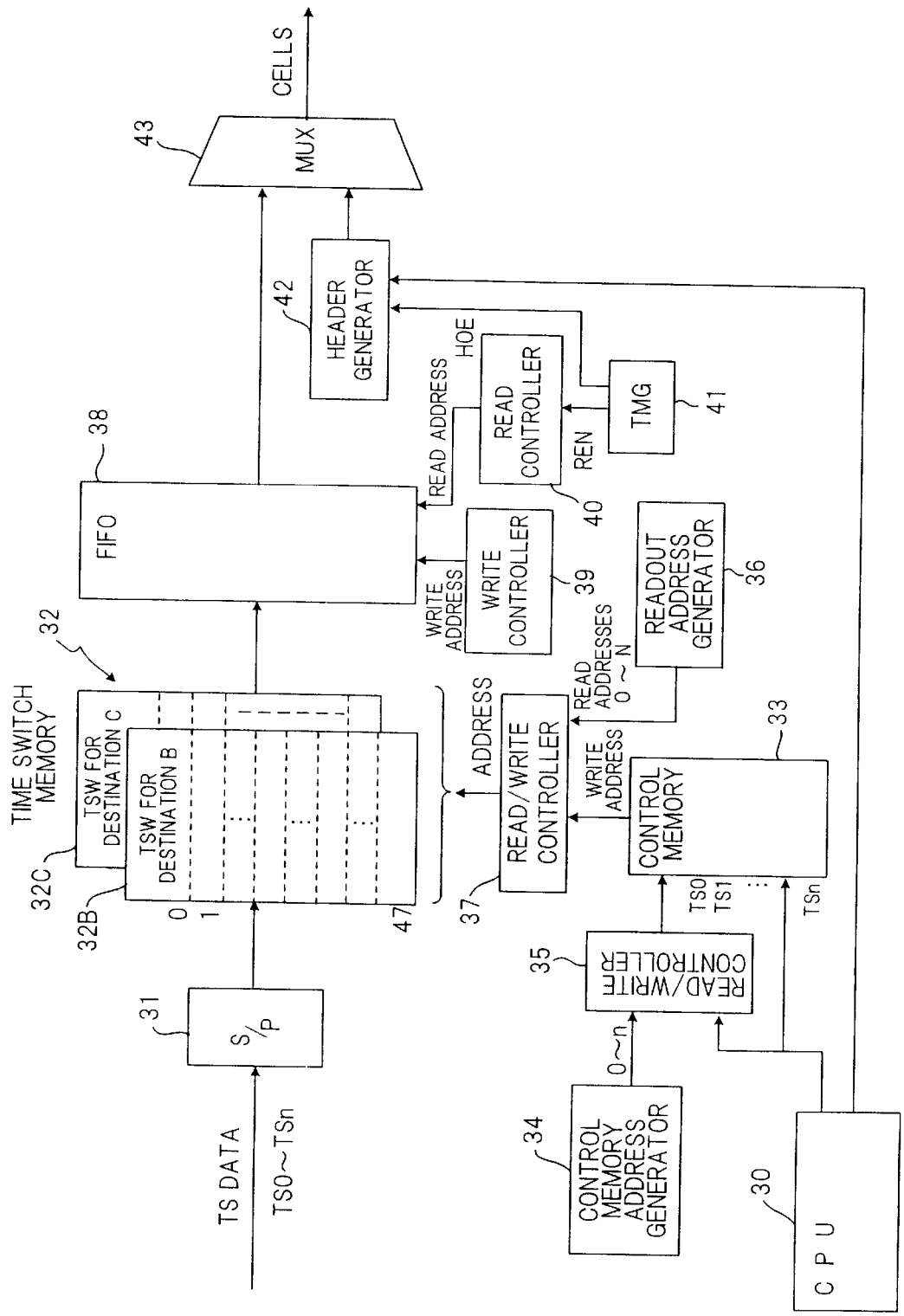
FIG. 3 is a block diagram showing the construction of the transmitting circuit of an STM switch.

FIG. 3 illustrates a first embodiment of a converting circuit for converting time division multiplexed frames to cells. The converting circuit is provided in an STM switch. It should be noted that a time division multiplexed frame of an STM network is obtained by time division multiplexing data of n+1channels and one byte per channel, and that an ATM cell is composed of a 5-byte header and a 48-byte payload.

The converting circuit shown in FIG. 3 includes a processor CPU 30 for controlling the STM switch, an S/P converter 31 for applying a serial-to-parallel conversion to bit-serial time division multiplexed data (TS data) of time slots TS0~TSn, and the time switch memory 32 having a storage area, which possesses 48 (the number of bytes in the payload) consecutive addresses for each destination STM switch. In regard to the STM switch 12A (FIG. 1), the destination STM switches are the STM switches 12B and 12C. Accordingly, the time switch memory 32 has the storage areas 32B, 32C, each of which possesses 48 consecutive addresses, for respective ones of the B and C destinations (STM switches 12B and 12C). However, in a case where the number of items of data sent to a certain destination STM switch in 125 μs exceeds 48 bytes (the number of bytes in the payload), two or more 48-address storage areas are provided for this destination STM switch. A control memory 33 stores the corresponding relationship between the time slot numbers TS0~TSn in a time division multiplexed frame and the addresses of the time switch memory 32. The corresponding relationship is decided when a call is set up and is set in the control memory 33 under control performed by the CPU 30.

Figure 4:
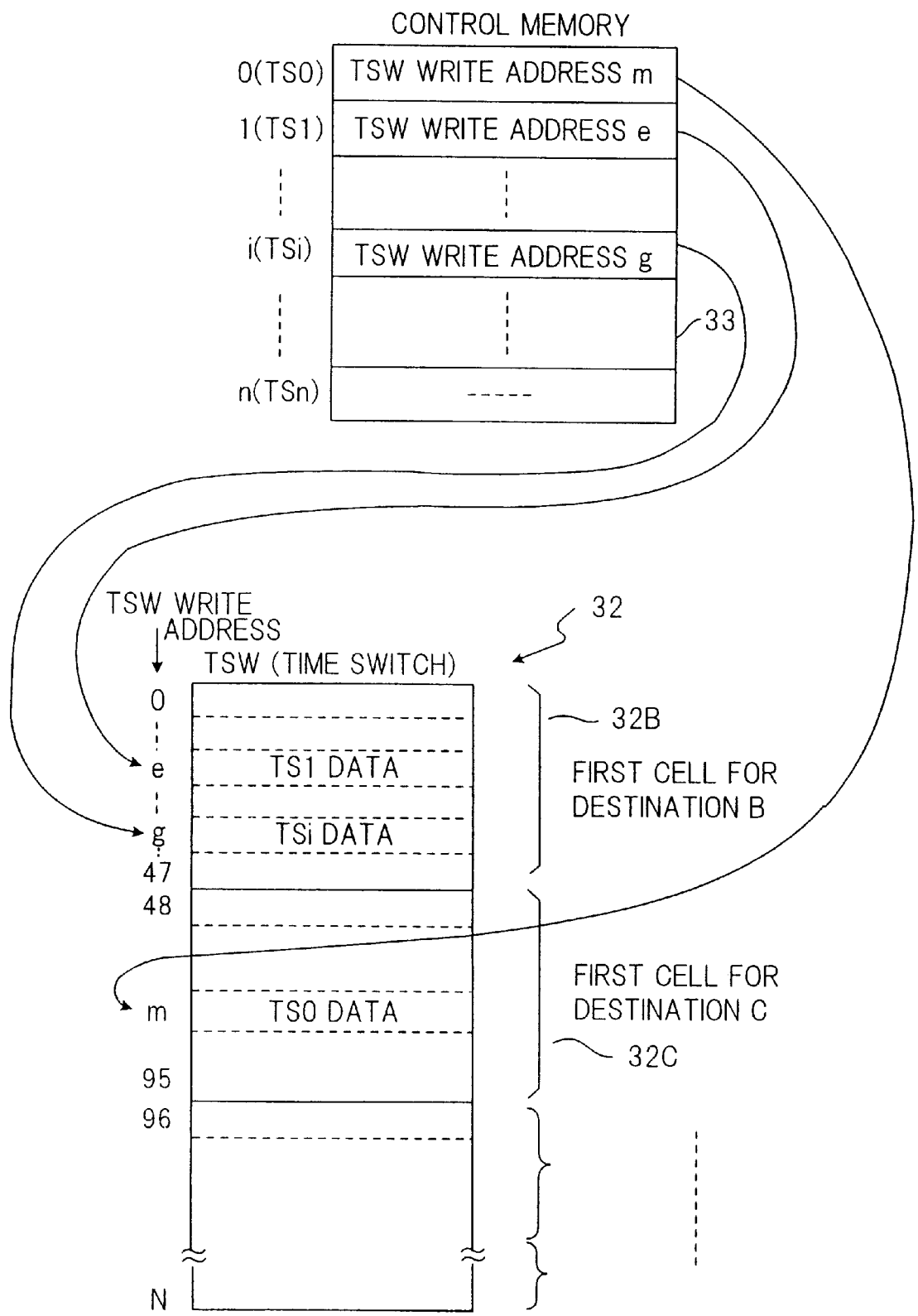
FIG. 4 is a diagram useful in describing a control memory and a time switch memory in the transmitting circuit of FIG. 3.

FIG. 4 is a diagram useful in describing the relationship between the control memory 33 and the time switch memory 32. Here addresses 0~n of the control memory 33 are mapped to the time slot numbers TS0~TSn, respectively, and the addresses of the time switch memory 32 are stored at the addresses 0~n (TS0~TSn). For example, in a case where the data of time slot TS0 is sent to a remote terminal via the destination STM switch 12C, the address m of the storage area 32C for destination C is stored at address 0 (TS0) of the control memory 33. In a case where the data of time slot TS1 is sent to a remote terminal via the destination STM switch 12B, the address e of the storage area 32B for destination B is stored at address 1 (TS1) of the control memory 33. Similarly, if data of a time slot TSi is sent to a remote terminal via a destination STM switch B, the address g of the storage area 32B for destination B is stored at address i (TSi) of the control memory 33.

With reference again to FIG. 3, a control memory address generator 34 generates the addresses TS0~TSn (actually 0~n) of the control memory 33 at a period identical with the timing at which the time division multiplexed data arrives (namely at the period of the time slots TS0~TSn). A read/write controller 35 controls the writing and reading of address data to and from the control memory 33. Specifically, in accordance with an indication from the CPU 30, the read/write controller 35 writes the above-described corresponding relationship (FIG. 4) to the control memory 33 and, on the basis of addresses 0~n output by the control memory address generator 34, reads the address data out of the control memory 33 in sequential fashion.

An address generator 36 sequentially generates all addresses 0~N of the time switch memory 32, and a read/write controller. 37 controls the writing and reading of data to and from the time switch memory 32. (1) When data is to be written to the time switch memory 32, the read/write controller 37 adopts an address, which has been read out of the control memory 33, as a write address and writes the time division multiplexed data which enters at this time to the time switch memory 32 using this write address. (2) When data is to be read out of the time switch memory 32, the read/write controller 37 reads data out of the time switch memory 32 sequentially based upon the readout addresses 0~N output by the address generator 36. In other words, when data is written, a write address g conforming to a time slot TSi (i=0~n) of the arriving time division multiplexed data is read out of the control memory 33 and the time shared data of the time slot TSi is stored in the time switch memory 32 at the location thereof specified by the address g, as shown in FIG. 4.

The buffer memory (FIFO buffer) 38, which stores the data that has been sequentially read out of the time switch memory 32, has a function for performing crossover between speed on the side of the STM network and speed on the side of the ATM network. The buffer memory 38 successively writes, from its starting address, the data that has been sequentially read out of the time switch memory 32 at the time slot period and successively outputs data from the starting address at a prescribed speed (a speed at which the time division multiplexed data can be transmitted by the 64-Kbps CBR. A write controller 39 generates write addresses at the period of the time slots. A read controller 40 generates readout addresses at a prescribed speed in such a manner that cells can be generated and transmitted so as to satisfy the 64-Kbps CBR. A timing generator 41 controls the readout timing of the FIFO buffer 38 as well as header output timing. More specifically, the timing generator 41 outputs, at the timing of the payload, a FIFO-buffer readout enable signal REN and, at the timing of the header, a header output enable signal HOE. A header generator 42 generates a cell header in accordance with an indication from the CPU 30 and outputs the header at the header timing. A combiner 43 combines the payload output by the FIFO buffer 38 and the header output by the header generator 42, thereby producing a cell, and outputs the cell.

Figure 5:
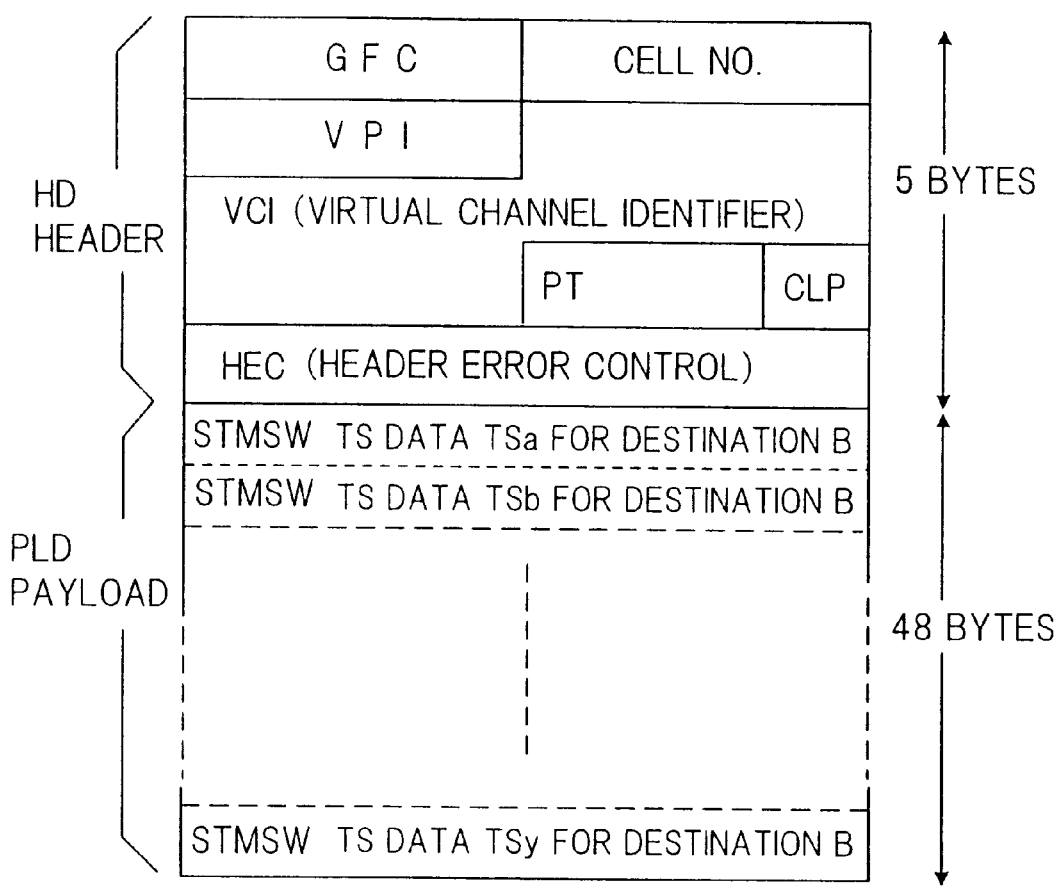
FIG. 5 is a diagram showing a cell format according to the present invention.

FIG. 5 is a diagram showing a cell format according to the present invention. The cell is composed of 5-byte header HD and 48-byte payload PLD. Part of the VPI of the header HD is used to represent the cell number (CELL. NO.). In a case where a destination STM switch generates a plurality of identical cells, it is necessary to distinguish among the cells. To accomplish this, the cell number is inserted using part of the VPI. Further, VPI/VCI values that have been set in advance in dependence upon the destination STM switch are added on as the VPI/VCI of header. That is, in accordance with an indication from the CPU 30, the header generator 42 inserts VPI/VCI values, which conform to the STM switch that is the destination of the cell, into the header and inserts the prescribed cell number (CELL NO.) into the header in order to identify the cell.

It is so arranged that a maximum of 48 time slots of data for the same STM switch are inserted into the 48-byte payload data area in the payload PLD. That is, for identical cells, time slot data directed to the same STM switch is allocated within the payload PLD of the cells. The particular time shared data (TS data) of time slot numbers that are inserted into the 48 payload data areas of the payload PLD is decided by negotiation between the STM switch:on the sending side and the STM switch on the receiving side at the time of call set-up.

If a call allocated to a certain time slot number has been completed, the data of this time slot number becomes invalid. However, cells are generated so long as other TS data is still valid. Further, there are instances where management is performed based upon an address identifier managed within a switch rather than on the basis of a VPI/VCI with regard to a header. In such instances a function for effecting a conversion from the VPI/VCI to the internal management address is required.

Figure 6:
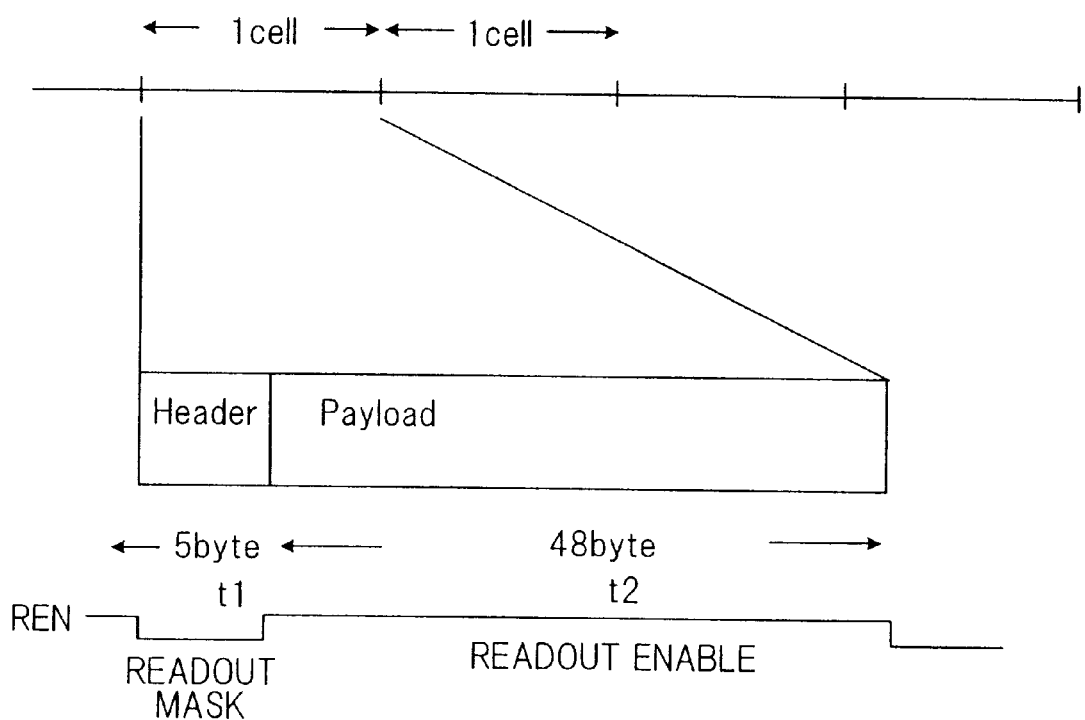
FIG. 6 is a diagram useful in describing FIFO readout timing.

FIG. 6 is a diagram useful in describing the timing at which data is read out of the FIFO buffer 38. One cell is composed of a 5-byte header and a 48-byte payload. The 48-byte payload is read out of the FIFO buffer 38 and the combiner 43 then combines the payload with the header that has been generated by the header generator 42, thereby producing and outputting a cell. Accordingly, the timing generator 41 instructs the readout controller 40 to implement a readout mask for a time $t_1$ corresponding to the five bytes of the header and inputs the high-level readout enable signal REN to the readout controller 40 for the time $t_2$ corresponding to the 48 bytes of the payload. As a result, the readout controller 40 reads the 48 bytes of time slot data having the same destination out of the FIFO buffer 38 and inputs this data to the combiner 43. Further, the timing generator 41 instructs the header generator 42 to send the header in the time $t_1$ corresponding to the five bytes of the header. As a result, the header generator 42 outputs the already created header to the combiner 43. The latter selectively outputs the header at the timing of $t_1$ and the payload at the timing of $t_2$, thereby sending a cell to the ATM switch. Cells are then produced one after another and sent to the ATM switch.

Figure 7:
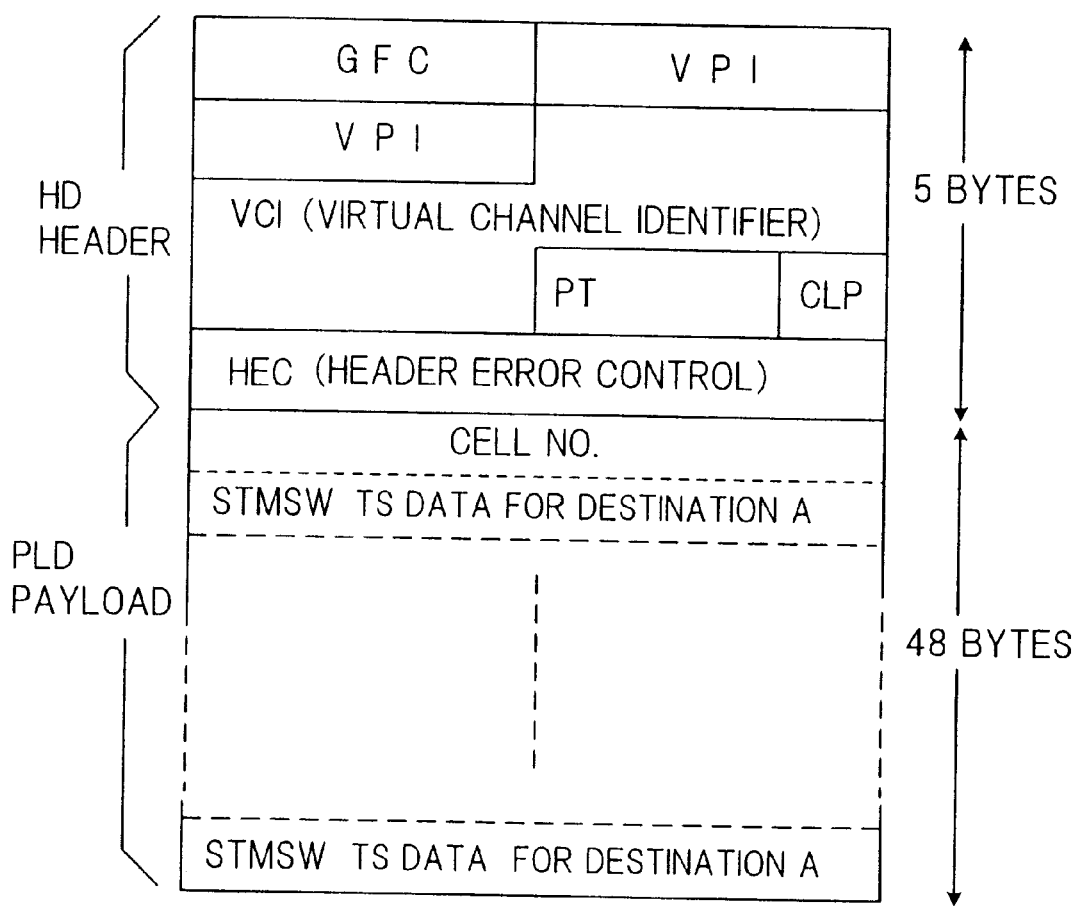
FIG. 7 is a diagram showing another cell format according to the present invention.

FIG. 7 is a diagram showing another cell format according to the present invention. This is an example in which the cell number (CELL. NO.) has been inserted into the starting byte area of the payload. According to this example, a maximum of only 47 time slots can be assured for one cell.

(c) Second Embodiment

Figure 8:
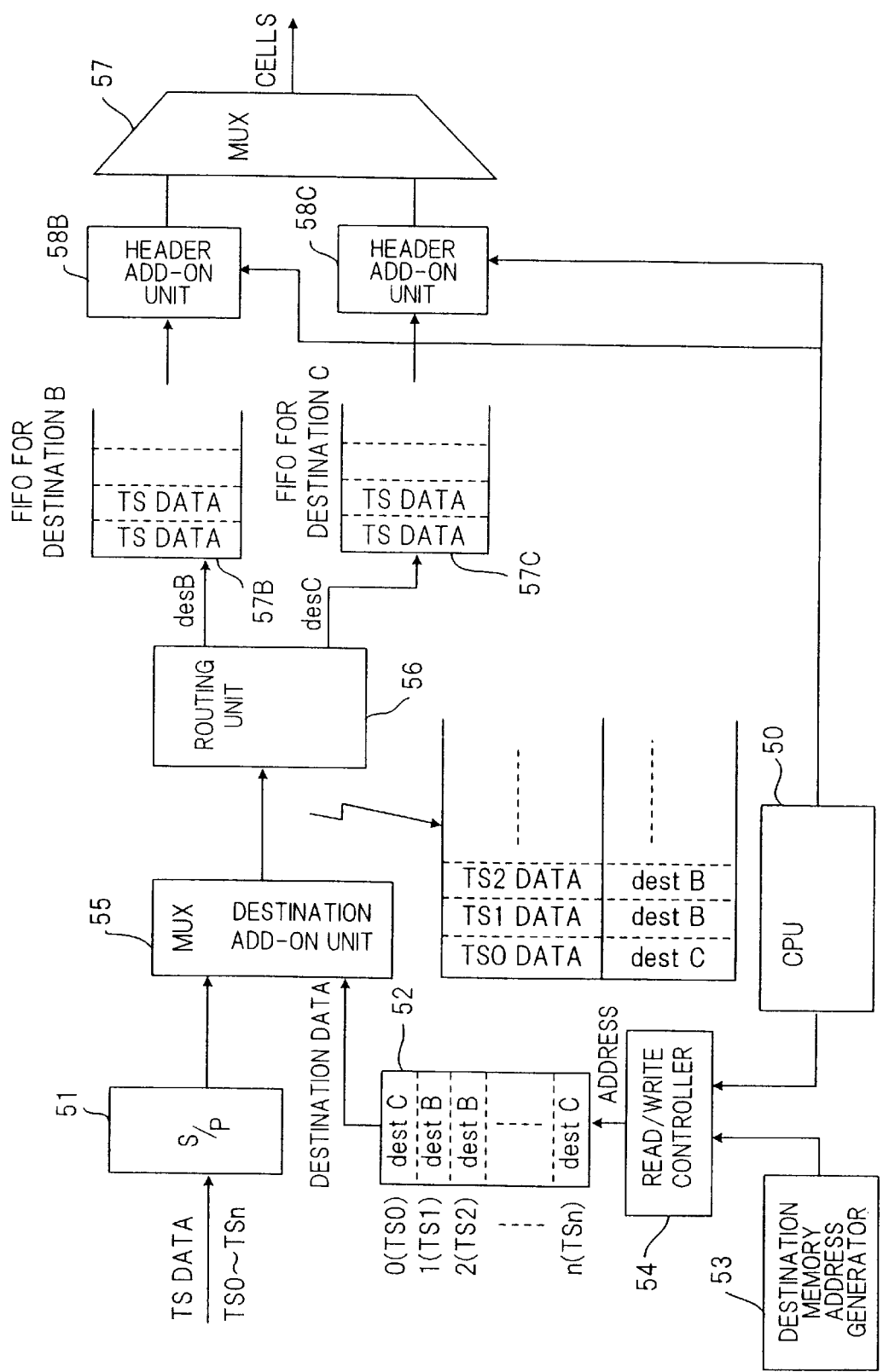
FIG. 8 is a block diagram showing another construction of the transmitting circuit of an STM switch.

FIG. 8 shows a second embodiment of a converting circuit for converting a time division multiplexed frame to cells. The converting circuit is provided in an STM switch. As in the first embodiment, the time division multiplexed frame of an STM network is obtained by time division multiplexing data of n+1 channels and one byte per channel, and an ATM cell is composed of a 5-byte header and a 48-byte payload.

The converting circuit shown in FIG. 8 includes a processor CPU 50 for controlling the STM switch, an S/P converter 51 for applying a serial-to-parallel conversion to bit-serial time division multiplexed data (TS data) of time slots TS0~TSn, and a destination memory 52 for storing the correspondence between the time slot numbers of a time division multiplexed frame and destination STM switches. The correspondence is decided when a call is set up and is set in the destination memory 52 under control performed by the CPU 50. A destination memory address generator 53 generates the addresses TS0~TSn (actually 0~n) of the destination memory 52 at a period identical with the timing at which the time division multiplexed data arrives (namely at the period of the time slots TS0~TSn). A read/write controller 54 controls the writing and reading of destination data to and from the destination memory 52. Specifically, in accordance with an indication from the CPU 50, the read/write controller 54 writes the above-described corresponding relationship (the correspondence between the time slot numbers and destinations) to the destination memory 52 and, on the basis of addresses 0~n output by the destination memory address generator 53, reads the destination data out of the destination memory 52 in sequential fashion.

A destination add-on unit 55 adds destinations, which have been stored in the destination memory 52, onto the data (TS data) in the time slots TS0~TSn. If destination C (dest C), a destination B (dest B), destination B (dest B) . . . have been stored at addresses 0, 1, 2 . . . , respectively, in the destination memory 52, then the destination dest C, destination dest B and destination dest B are added onto the data of time slots TS0, TS1 and TS2, respectively, as shown in FIG. 8. Time division multiplexed data onto which destinations have been added enter a routing unit 56 from the destination add-on unit 55. The routing unit 56 disassembles the time division data on a per-destination basis and outputs the disassembled TS data. FIFO buffers 57A, 57B are provided for respective ones of the destinations and store the disassembled TS data output by the routing unit 56. The TS data destined for the STM switch 12B is written to the FIFO buffer 57B for destination B, and the TS data destined for the STM switch 12C is written to the FIFO buffer 57C for destination C.

Header add-on units 58B, 58C generate headers and add the headers onto the 48-byte data (payloads) successively read out of the FIFO buffers 57B, 57C, thereby producing cells (see FIG. 5). (1) In accordance with an indication from the CPU 50, each of the header add-on units 58B, 58C inserts VPI/VCI values, which conform to the STM switch that is the destination of the cell. (2) In a case where a plurality cells having the same destination are generated in 125 µs, the header add-on units 58B, 58C generate different cell numbers (CELL NO.) and insert the cell numbers into the respective headers in order to identify the respective cells. A cell multiplexer 59 multiplexes the cells output by the header add-on units 58B 58C and sends the multiplexed cells to the ATM switch.

The method used by the converting circuit according to the second embodiment involves multiplexing time slot data and destination data and deciding a path autonomously by hardware in the routing unit. This converter makes it possible to perform switching merely by setting the destination data.

Figure 9:
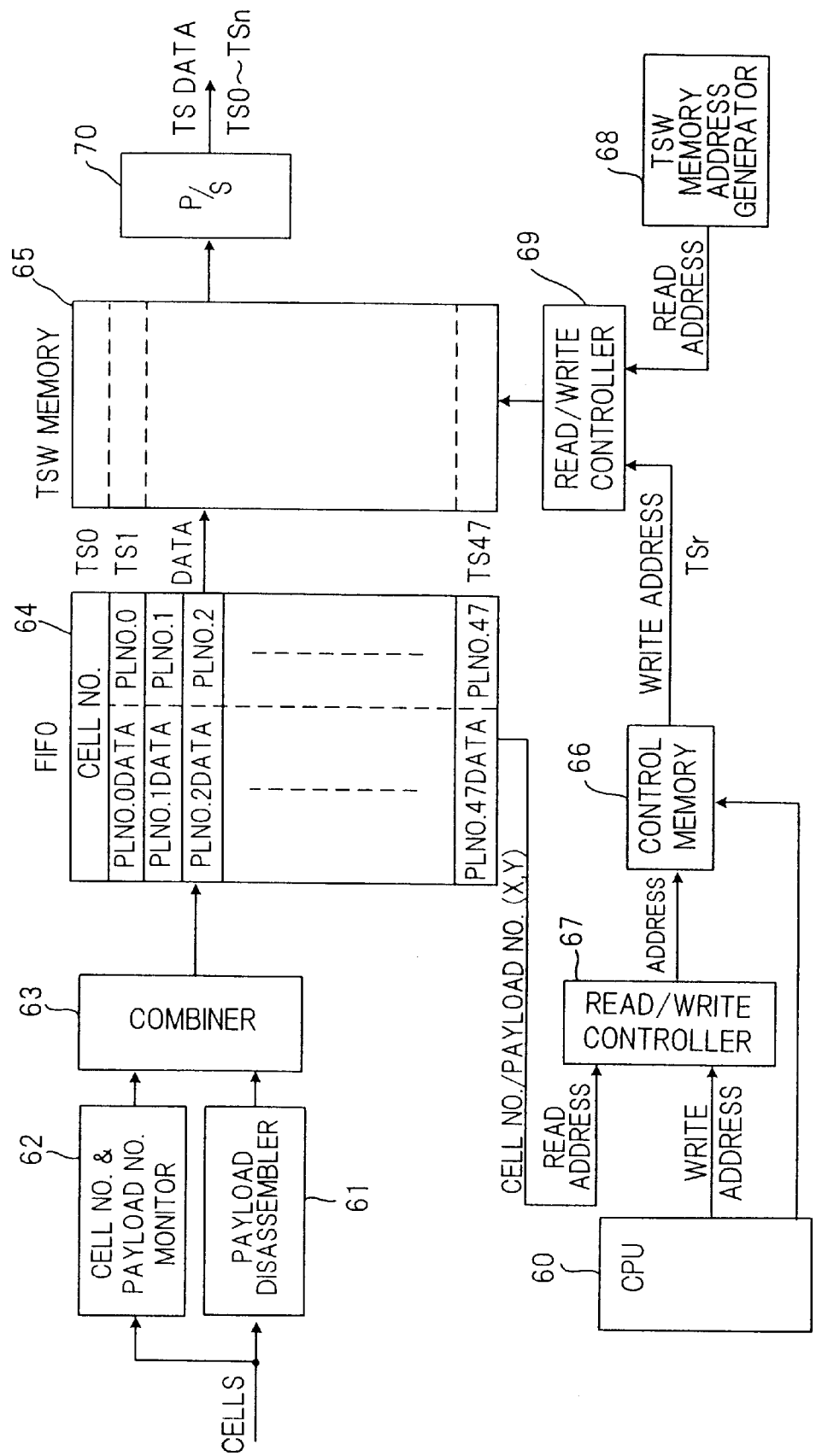
FIG. 9 is a block diagram showing the construction of the receiving circuit of an STM switch.

(C) Converting Circuit for Converting Cells to Time Division Multiplexed Frame (a) Overview It is required that an STM switch that receives cells from an ATM switch convert the received cells to time division multiplexed frames. Accordingly, as shown in FIG. 9, cell data that has been received is buffered in a FIFO buffer 64 of an STM switch on the receiving side, and 48 bytes of payload data that have been stored in the FIFO buffer 64 are mapped to prescribed time slots to thereby effect the conversion to time division multiplexed frames. In order to make such a conversion possible, a cell number (CELL NO.) and payload numbers (Payload No.) are written to the FIFO buffer 64 together with the received data. A cell number, which is contained in the header of the cell, is extracted from the cell and written to the FIFO buffer 64 together with the received data. Payload numbers are successively counted byte by byte from the beginning of the cell and are written to the FIFO buffer 64 as Payload No. 0, Payload No. 1, Payload No. 2, . . . , Payload No. 47 starting from the sixth byte. Further, in order to make this cell-to-frame conversion possible, a control memory 66 is provided. The correspondence between combinations of CELL. NO. and Payload No. and the time slots TS0~TSn is stored in the control memory 66 beforehand. A time slot number corresponding to a combination of CELL. NO. and Payload No. that has been added onto data read out of the FIFO buffer 64 is obtained from the control memory 66, and the data that has been read out of the FIFO buffer 64 is stored in a time switch memory 65 at a location whose address is the time slot number obtained from the control memory 66. Data is subsequently read out of the time switch memory 65 sequentially in the order of the time slots starting from the beginning of the memory and the data is delivered as an output. As a result, cells are converted to a time division multiplexed frame.

(b) FIG. 9 illustrates an embodiment of a converting circuit for converting cells to time division multiplexed frames. The converting circuit includes a processor CPU 30 for controlling the STM switch, a payload disassembler 61 for extracting 48 bytes of payload data from a received cell, and a cell number/payload number monitoring unit 62 for extracting a cell number attached to a cell and for identifying the payload number. The cell number/payload number monitoring unit 62 counts bytes one at a time in regular order starting from the beginning of a cell and identifies the payload number as Payload No. 0, Payload No. 1, . . . , Payload No. 47 starting from the sixth byte. A combiner 63 initially outputs the cell number (CELL NO.) and subsequently adds Payload No. 0, Payload No. 1, ..., Payload No. 47 onto the 48 items of payload data. The FIFO buffer 64 stores the cell number (CELL NO.) and the payload data of Payload No. 0, Payload No. 1, ..., Payload No. 47 in the manner illustrated in FIG. 9.

Figure 10:
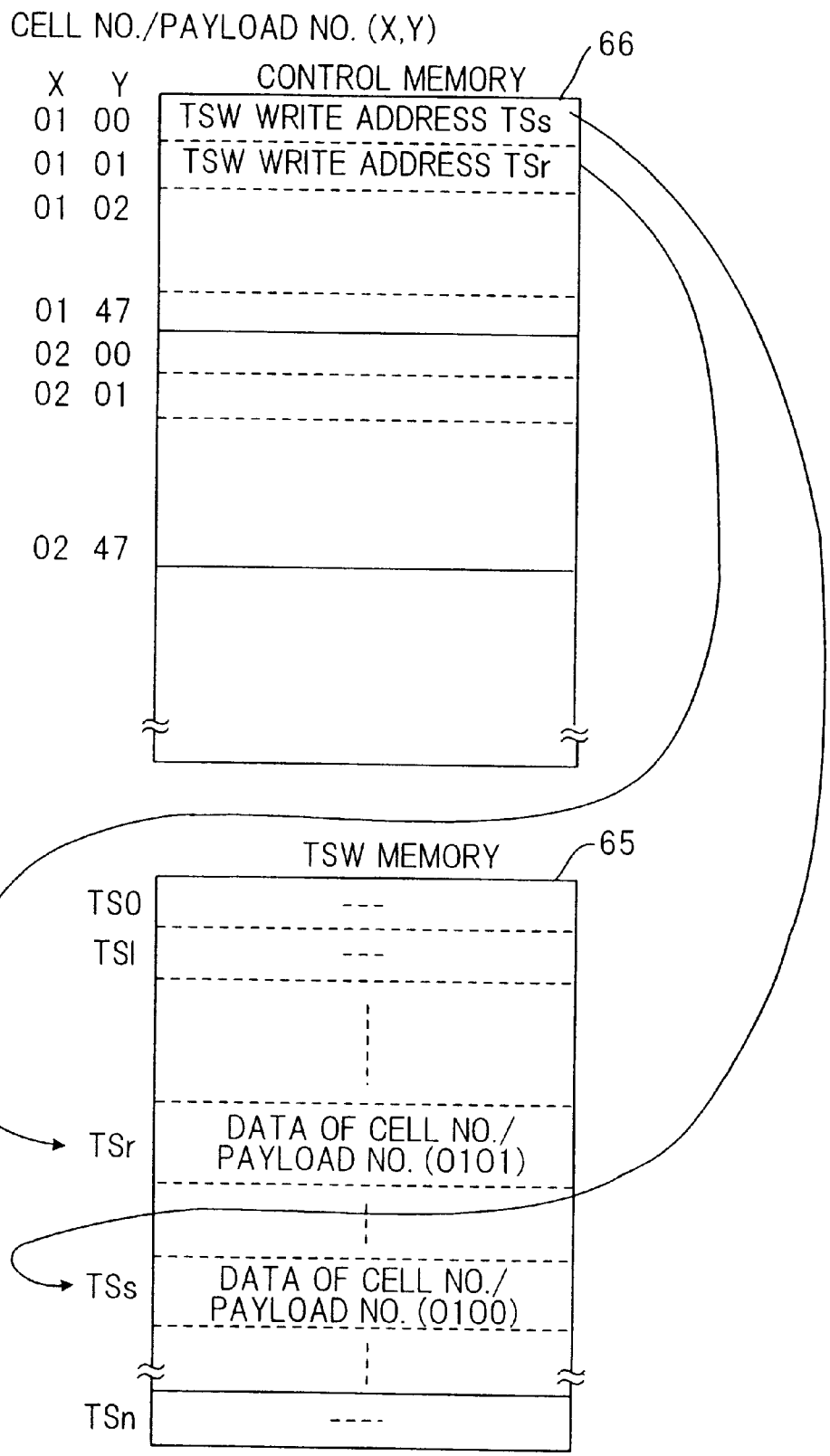
FIG. 10 is a diagram useful in describing a control memory and a time switch memory in the receiving circuit of FIG. 9.

The time switch memory 65 has the time slot numbers TS0~TSn as addresses and stores data read out of the FIFO buffer 64 at prescribed addresses. The control memory 66 stores the correspondence between combinations (X,Y) of CELL NO. and Payload No. and time slot numbers TS0~TSn. The correspondence is decided when a call is set up and is set in the control memory 66 under the control of the CPU 60. A combination (X,Y) of CELL NO. and Payload No. serves as an address of a storage area in the control memory 66, and a time slot number (an address of the time switch memory 65) that corresponds to the address is stored in the addressed storage area. FIG. 10 is a diagram useful in describing the relationship between the control memory 66 and time switch memory 65. Addresses of the time switch memory 65 are stored at addresses (X,Y) of the control memory 66. For example, a time slot TSs is stored at address (X,Y)=(01,00), and a time slot TSr is stored at address (X,Y)=(01,01).

A read/write controller 67 controls the writing of time slot numbers to and the reading of time slot numbers from the control memory 66. The read/write controller 67 (1) writes the above-mentioned corresponding relationship (FIG. 10) to the control memory 66 in response to an indication from the CPU 60, (2) reads a time slot number out of the control memory 66 using, as the address, a combination (X,Y) of CELL NO. and Payload No. attached to payload data that has been read out of the FIFO buffer 64, and (3) outputs this time slot number as the write address of time switch memory 65. A time switch memory address generator 68 successively generates the readout addresses TS0~TSn (actually 0~n) of the time switch memory 65 at the period of the time slots. A read/write controller 69 controls the writing and reading of data to and from the time switch memory 65. A P/S converter 70 converts parallel data, which has been read out of the time switch memory 65, to bit-serial series data. When data is written to the time switch memory 65, the time switch memory address generator 68 writes data, which has been read out of the FIFO buffer 64, to the time switch memory 65 using the time slot number (TS0~TSn), which has been read out of the control memory 66, as a write address. When data is read out the time switch memory 65, the time switch memory address generator 68 reads data out of the time switch memory 65 sequentially based upon readout addresses 0~n (TS0~TSn) output by the address generator 68. Thus, received cells are converted to time division multiplexed frames.

More specifically, data is read sequentially from the FIFO buffer 64 in which the payload data of a received cell has been stored. Since CELL NO. and Payload No. have been added onto the data read out, the combination (X,Y) of CELL NO. and Payload No. serves as the readout address of the control memory 66 (see FIG. 10). The time slot number TSr is read out of the storage area of control memory 66 designated by the readout address (X,Y) (=01,00), and the time slot number TSr is used as the write address of the time switch memory 65. The read/write controller 69 writes the data (CELL NO.=01, Payload No.=00), which has been read out of the FIFO buffer 64, to the storage area of time switch memory 65 specified by the write address TSr. The read/write controller 69 thenceforth writes data to the time switch memory 65 in similar fashion.

In concurrence with the operation described above, the read/write controller 69 reads TS data out of the time switch memory 65 sequentially based upon readout addresses 0~n (TS0~TSn) generated by the time switch memory address generator 68. As a result, received cells can be converted to time division multiplexed frames.

(c) Absorption of Fluctuation

Figure 11:
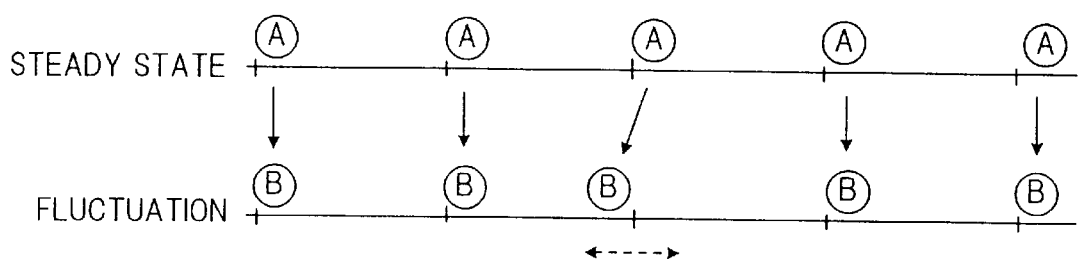
FIG. 11 is a diagram useful in describing cell fluctuation.

In order to satisfy the requirement for 64-Kbps bit rate, the above-mentioned time slot data must be received every 125 $\mu$s. However, since the cells pass through an ATM switch, cell fluctuation actually occurs. Accordingly, it is required that a buffer for absorbing such cell fluctuation be provided at the input to the STM switch on the receiving side. FIG. 11 is a diagram useful in describing cell fluctuation. Though time slot data A is received correctly every 125 $\mu$s in the case of a frame in the steady state, there are instances where time slot data B is received twice in 125 $\mu$s in the case of a frame in which there is cell fluctuation. This means that it is necessary to output the time slot data upon first holding it in a buffer for the originally required length of time. Buffer depth (buffer length) depends upon cell fluctuation; the greater the fluctuation, the larger the buffer depth must be made, e.g., to a depth equivalent to two or three frames. For example, if fluctuation is 10 $\mu$s, a buffer having a depth equivalent to two frames will be necessary. In actuality, however, the greater the depth, the greater the delay in cell arrival. Merely increasing buffer depth, therefore, is not an acceptable approach.

As for application in a receiving circuit, it has been contemplated to provide a cell buffer capable of accumulating one frame of data in order to absorb fluctuation in a case where cell arrival fluctuation is small. However, the more data accumulated, the greater the amount of memory capacity and the greater the delay in arrival.

Accordingly, it is so arranged that the FIFO buffer 64 (FIG. 9) can store the payloads of a plurality of cells, and the timing at which the payload data of each cell is read out of the buffer is managed so that prescribed payload data is read out of the FIFO buffer 64 at the above-mentioned timing. As a result, time slot data is transmitted correctly at intervals of 125 $\mu$s even if cell fluctuation occurs.

Figure 12:
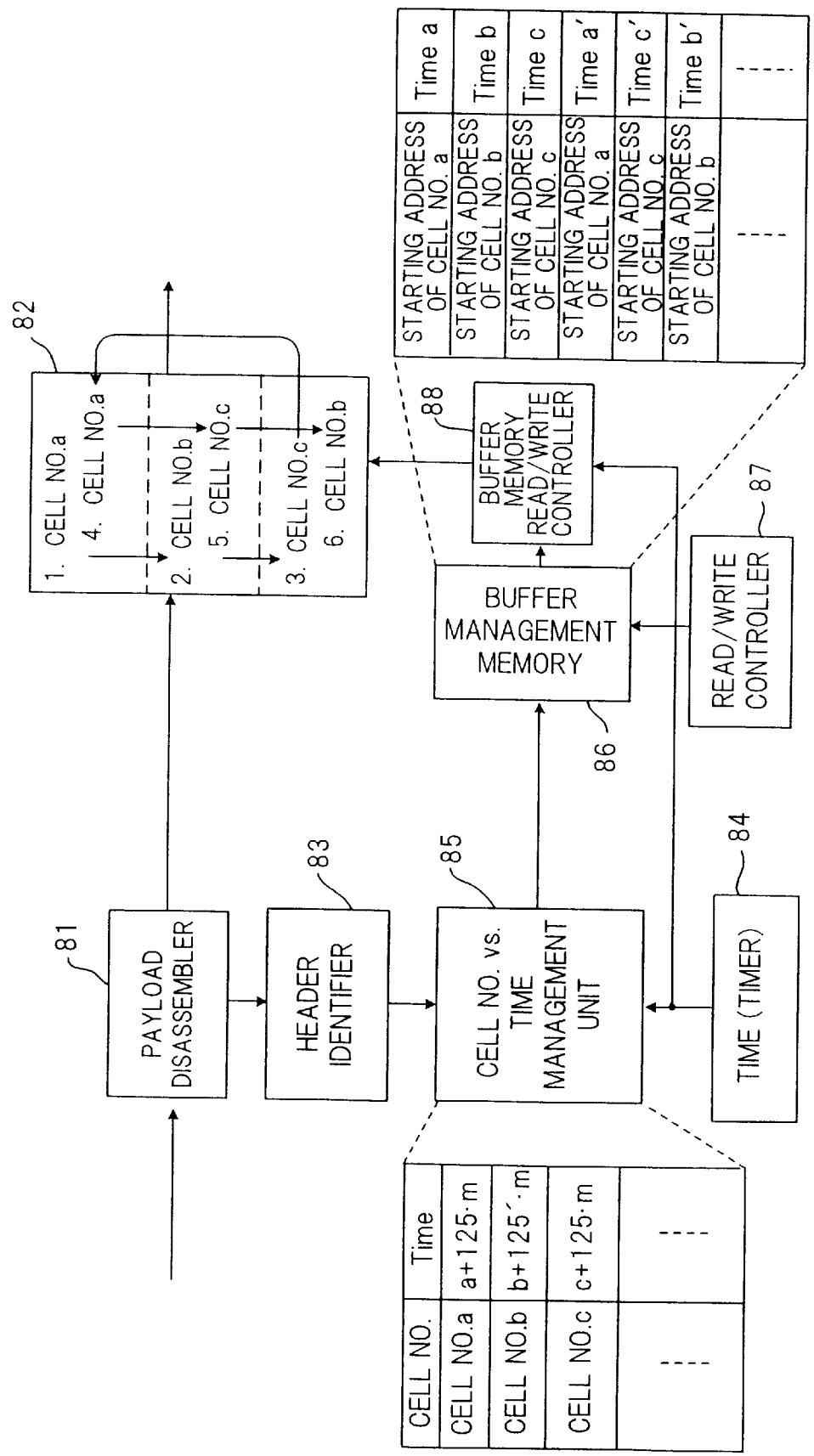
FIG. 12 is a block diagram showing the construction of a fluctuation absorbing circuit.

FIG. 12 is a diagram showing the construction of a fluctuation absorbing circuit for absorbing the cell fluctuation described above. The circuit includes a payload disassembler 81, and a cell buffer 82 (which corresponds to the cell buffer 64 in FIG. 9) having capacity for a plurality of cells, e.g., three cells. When the cell buffer 82 becomes full, cells are overwritten in regular order starting from the beginning of the buffer. Though not shown, cell numbers and payload numbers are stored, along with payload data, in the cell buffer 82 in the manner described above with reference to FIG. 9. A header identification unit 83 identifies the cell number that has been inserted into a header. Numeral 84 denotes a timer and 85 a cell number vs. time management unit. When an initial cell having a prescribed cell number arrives and is stored in the cell buffer 82, the cell number vs. time management unit 85 decides the timing at which the cell having this cell number is read out of the cell buffer 82 and stores this readout timing in correspondence with the cell number. For example, the first time a cell having Cell No. a arrives, readout timing a of the initial cell is decided in conformity with Cell No. a and readout timings of subsequent cells having cell number are stored as times (a+125·m) (m=1, 2, ...) delayed by 125 $\mu$m each. Similarly, the first time a cell having Cell No. b arrives, readout timing b of the initial cell is decided in conformity with Cell No. b and readout timings of subsequent cells having cell number b are stored as times (b+125·m) (m=1, 2, ...) delayed by 125 $\mu$m each.

A buffer management memory 86 stores the above-mentioned cell readout timings in correspondence with the cell numbers of cells and starting addresses stored in the buffer 82. For example, if cells arrive in the order Cell No. a→Cell No. b→Cell No. c→Cell No. a→Cell No. c→Cell No. b . . . , then the readout times of these cells will be as follows:

readout time of initial Cell No. a is a;
readout time of initial Cell No. b is b;
readout time of initial Cell No. c is c;
readout time of second Cell No. a is a' (=a+125 μs);
readout time of second Cell No. c is c' (=c+125 μs); and
readout time of second Cell No. b is b' (=b+125 μs).

Accordingly, as shown in FIG. 12, these readout times a, b, c, a', c' and b' are stored in the buffer management memory 86 in correspondence with the following:

starting payload address of initial Cell No. a;
starting payload address of initial Cell No. b;
starting payload address of initial Cell No. c;
starting payload address of second Cell No. a;
starting payload address of second Cell No. c; and
starting payload address of initial Cell No. b; respectively.

It should be noted that three cells are stored in the cell buffer 82 consecutively in the following manner:

initial Cell No. a, initial Cell No. b, initial Cell No. c;
→second Cell No. a, initial Cell No. b, initial Cell No. c;
→second Cell No. a, second Cell No. c, initial Cell No. c;
→second Cell No. a, second Cell No. c, second Cell No. b;

and so on.

The buffer management memory 86 has a read/write controller 86 for writing the correspondence between Cell No./starting address and readout time to the buffer management memory 86, finds the nearest readout time from the current time stored in the buffer management memory 86 and outputs this Cell No./starting address and readout time. The buffer memory 82 has a read/write controller 88. The Cell No./starting address and readout time from the buffer management memory 86 enter the read/write controller 88 which, when the entered readout time arrives, outputs 48 items of payload data from the buffer memory 82 (from the entered starting address thereof).

Thus, the arrangement described above is such that even if cells do not arrive correctly at intervals of 125 μs owing to fluctuation within the ATM switch, the cells are buffered temporarily, after which they can be read out of the buffer at intervals of 125 μs in correct fashion. Even if the order of arrival of the second Cell No. b and second Cell No. c is reversed for some reason, as in the illustrated example, the second Cell No. b will be read out ahead of the second Cell No. c because the readout time b' is earlier than readout time c'. Further, the second Cell No. b can be read out and transmitted correctly 125 μs after the initial Cell No. b is transmitted.

(D) Bandwidth Management

Figure 13:
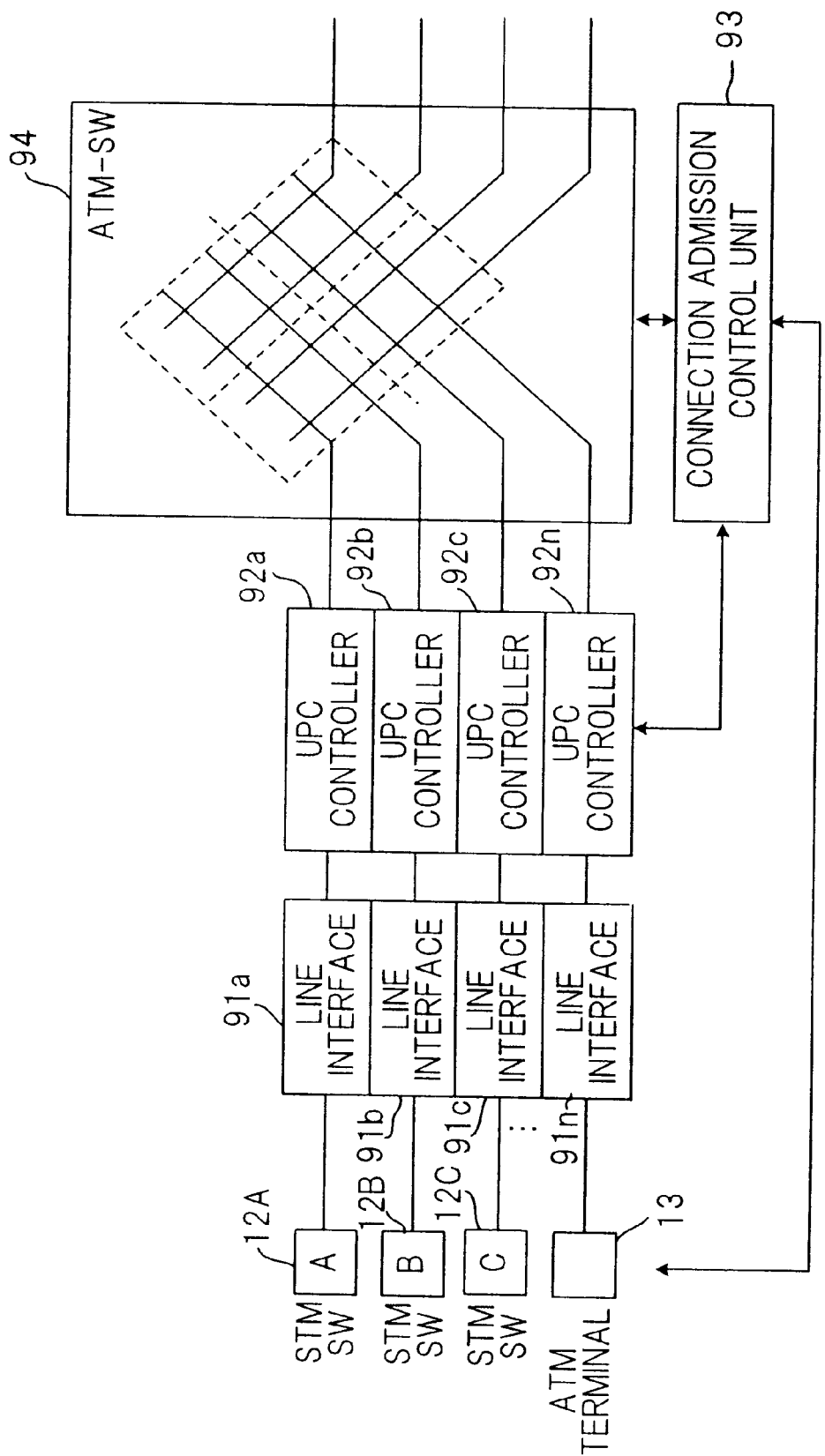
FIG. 13 is a block diagram useful in describing bandwidth management in an ATM switch.

FIG. 13 is a diagram useful in describing bandwidth management of an ATM switch. Shown in FIG. 13 are line interfaces 91a~91n, UPCs (Usage Parameter Controllers) 92a~92n for monitoring by comparing reported bandwidth and current cell traffic to determine whether cells are flowing in as reported, a connection admission control unit 93 for performing connection admission control in accordance with the present invention, and a switch 94.

Figure 14:
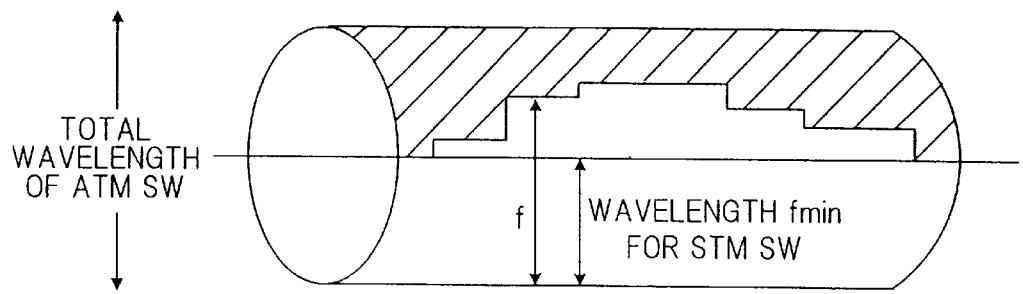
FIG. 14 is a diagram useful in describing bandwidth management.

FIG. 14 is a diagram useful in describing bandwidth management. Bandwidth fmin, which is part of total physical bandwidth F of an ATM switch, is set beforehand as dedicated bandwidth (PVC bandwidth) between STM switches, and control is performed in such a manner that dedicated bandwidth f between STM switches is varied in dependence upon a single day's traffic.

Bandwidth used between STM switches increases or decreases depending upon traffic. Accordingly, it is preferred that connection of a path within an STM switch be performed by an SVC (Switch Virtual Channel) service. However, when another ATM terminal is using the full bandwidth of an ATM switch, a CBR path is no longer established between STM switches. Accordingly, in bandwidth management of an ATM switch according to the present invention, the dedicated bandwidth f is decided for the path between STM switches (a PVC of bandwidth f is established), and a path between STM switches is established to the greatest extent possible within the dedicated bandwidth. If the dedicated bandwidth f is reserved between STM switches in advance in this manner, waste occurs when the traffic of an STM switch is low. Accordingly, the minimum value fmin of dedicated bandwidth f between STM switches is set in advance and the dedicated bandwidth f is varied dynamically in dependence upon one day of traffic. In other words, the path established by the PVC is varied. As a result, wasting of bandwidth is reduced.

Figure 15:
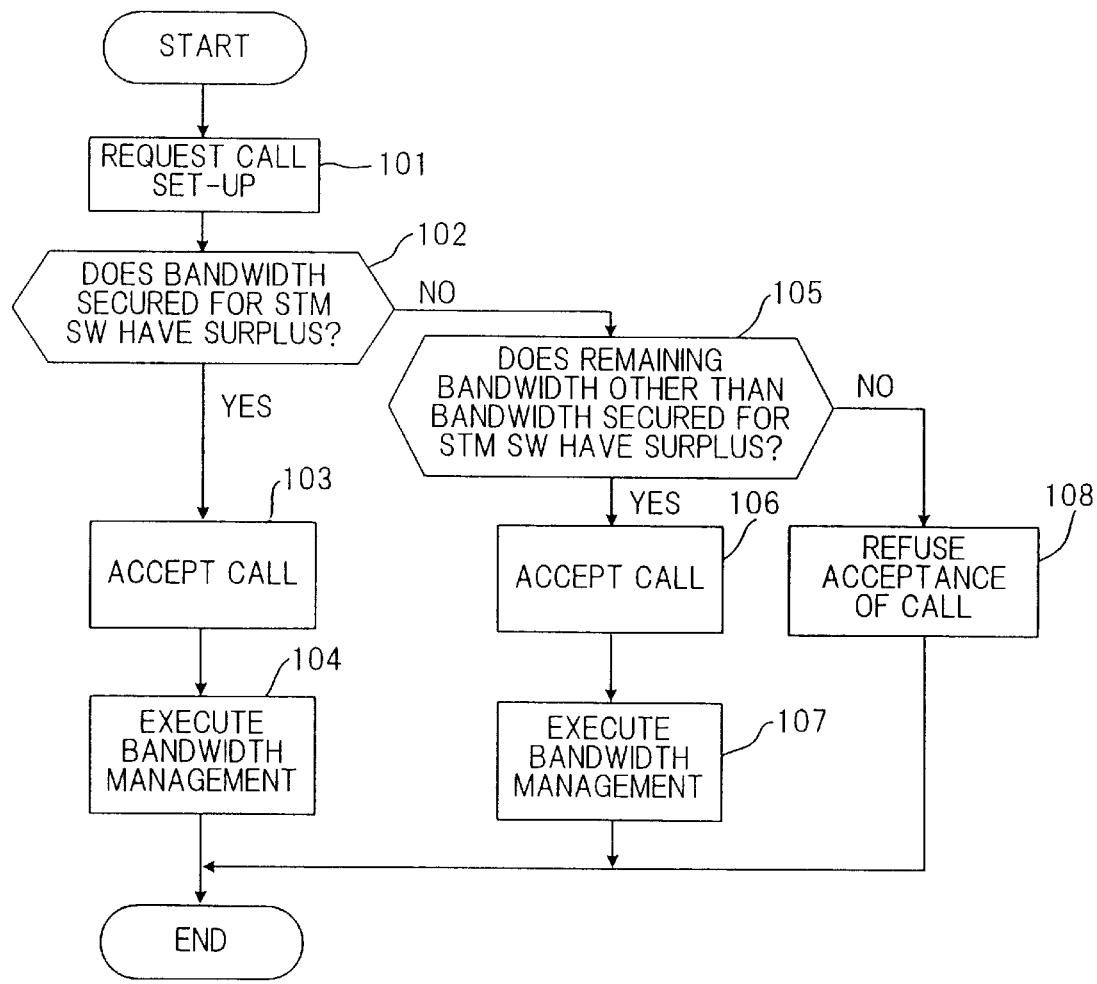
FIG. 15 is a processing flowchart of connection admission control in an ATM switch.

FIG. 15 is a processing flowchart of connection admission control in an ATM switch. When a call set-up request is issued by an STM switch (step 101), the connection admission control unit 93 (FIG. 13) checks to determine whether the dedicated bandwidth f of a path includes unused bandwidth necessary for accepting a CBR call (a CBR call having a bandwidth of 64 Kbps) (step 102). If there is enough margin for accepting the CBR call, then the call is accepted and communication is carried out using bandwidth for which a path has already been established by a PVC (step 103). Management of the dedicated bandwidth (calculation of unused bandwidth and updating) is then performed (step 104).

If it is found at step 102 that the dedicated bandwidth f does not have unused bandwidth necessary for accepting the CBR call, then it is determined whether bandwidth (see the shaded bandwidth in FIG. 14) other than the dedicated bandwidth contains unused bandwidth necessary for accepting the CBR call, which has a bandwidth of 64 Kbps (step 105). If there is enough margin for accepting the CBR call, then the call is accepted and communication is carried out by the SVC service (step 106). Management of remaining bandwidth other than the dedicated bandwidth (calculation of unused bandwidth and updating) is performed (step 107).

If it is found at step 105 that remaining bandwidth other than the dedicated bandwidth does not have unused bandwidth necessary for accepting the CBR call, then call acceptance is refused (step 108).

Figure 16B:
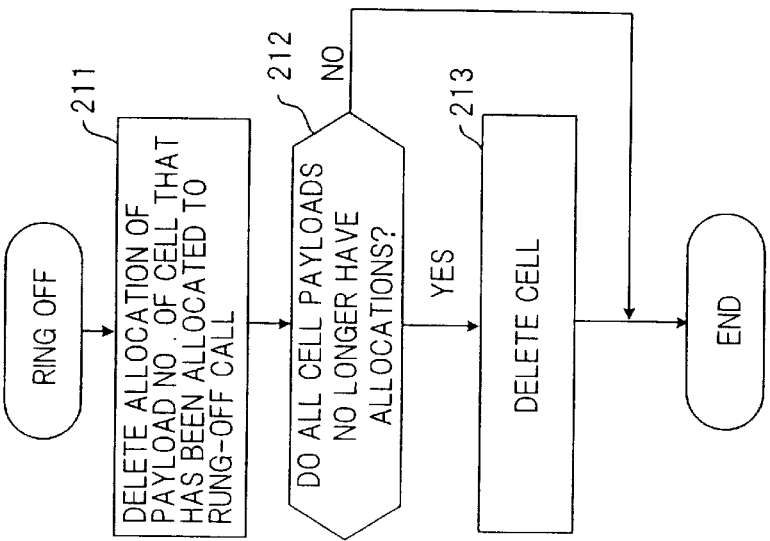
FIG. 16B is a flowchart of ring-off processing in an STM switch.
Figure 16A:
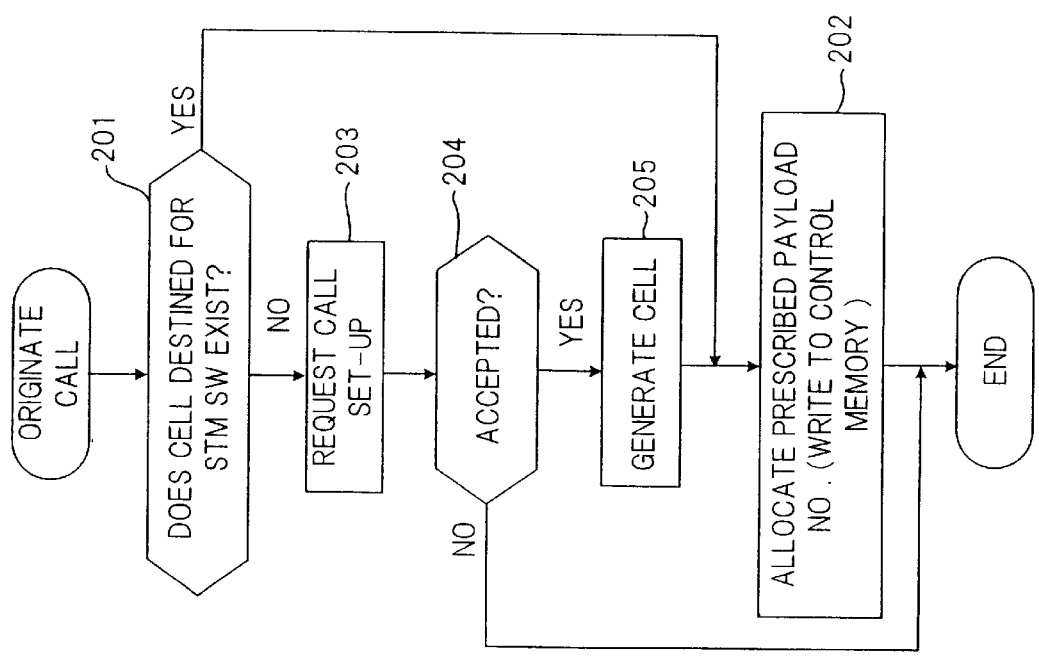
FIG. 16A is a flowchart of call originating processing in an STM switch.
Figure 17:
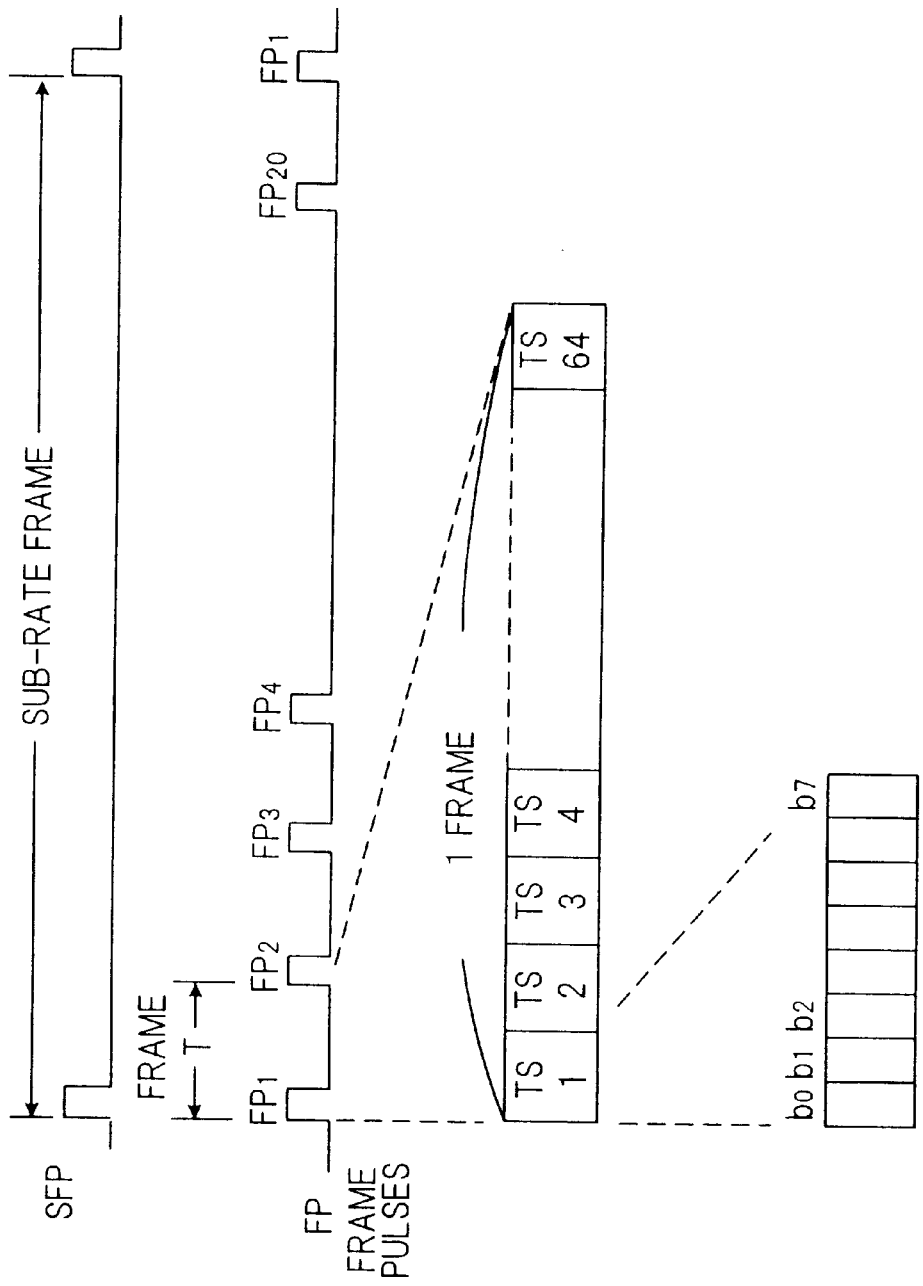
FIG. 17 is a diagram showing an example of the structure of a frame in an STM network according to the prior art.
Figure 18:
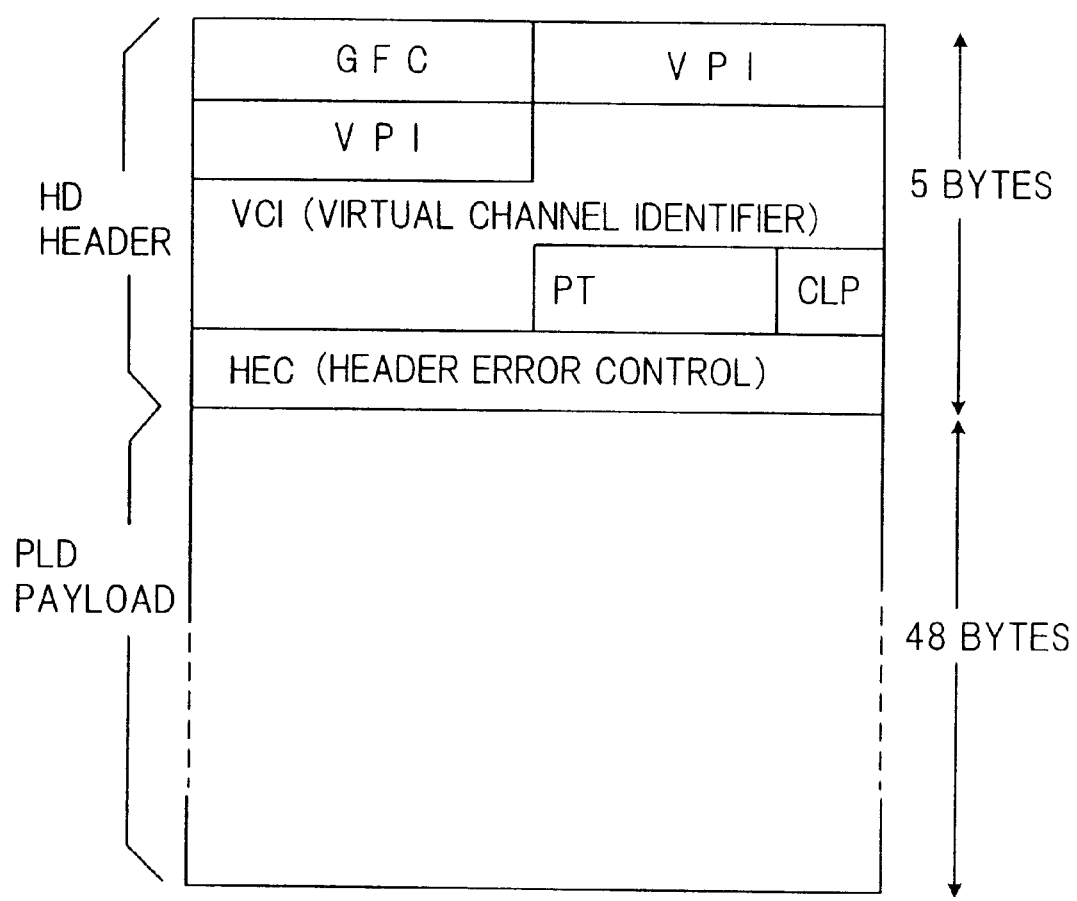
FIG. 18 is a diagram showing an example a cell format in an ATM network.

(E) Call Originating/ring-off Processing of STM Switch (a) Call Originating Processing FIG. 16A is a flowchart of call originating processing executed by a CPU in an STM switch.

When a call is originated from a terminal under its control, the CPU 30 (see FIG. 3) allocates a time slot TSi to this call. The CPU 30 further obtains a destination STM switch routed to a remote terminal and determines whether a cell directed to this STM switch already exists and whether the payload of this cell has a vacancy for inclusion of TS data (step 201). If the cell exists and has a vacancy, the call is allocated to the vacant payload number of this cell and the remote STM switch is notified of the cell number and payload number. The CPU 30 further obtains the address g of the time switch memory 32 that corresponds to the allocated payload number and writes the address g to the address i (TSi) of control memory 33 (see FIG. 3) (step 202). As a result, the data from the originating terminal is sent to the remote terminal via the STM switch on the originating side, the STM switch and the ATM switch on the receiving side.

If it is found at step 201 that a cell addressed to the STM switch does not exist or that there is no vacancy, then the CPU sends a call set-up request to the ATM switch (step 203) and then checks to determine whether the call originating request has been accepted by the ATM switch (step 204). If acceptance of the all is refused, the CPU terminates call originating processing.

If the call set-up request is accepted, then a new cell directed to the STM switch is generated (step 205), the leading payload number of this cell is allocated and the remote STM switch is notified of the cell number and payload number. The CPU 30 further obtains the address of the time switch memory 32 that corresponds to the allocated payload number and writes this address to the address i (TSi) of control memory 33 (step 202). The data from the originating terminal is subsequently sent to the remote terminal via the STM switch on the originating side, the ATM switch and the STM switch on the receiving side.

(b) Ring-off Processing

FIG. 16B is a flowchart of ring-off processing executed by a CPU in an STM switch.

When an on-hook operation is performed, the CPU deletes the allocation of the payload number of the cell that has been allocated to the rung-off call (step 211). Next, the CPU checks to determine whether all payload numbers in the cell no longer have allocations (step 212). If the answer is "YES", the cell is deleted (step 213). The CPU further notifies the ATM switch of the fact that the cell has been deleted. As a result, the ATM switch performs bandwidth management. If it is found at step 212 that allocation of a payload number exists, then ring-off processing is terminated.

Thus, in accordance with the present invention, a converting circuit for converting time division multiplexed frames of an STM network to cells of an ATM network and a converting circuit for converting cells of an ATM network to time division multiplexed frames of an STM network are provided. This makes it possible for information to be transmitted between the STM and ATM networks so that a mixed systems of STM and ATM networks can be realized.

In accordance with the present invention, a cell number for cell identification is added onto each cell in a case where a plurality of cells directed toward the same STM switch exist. As a result, cells can be distinguished from one another even if they are not in order, thus allowing communication to be performed correctly.

In accordance with the present invention, the payloads of a plurality of cells are stored in a cell buffer of the STM switch on the receiving side, the timing at which the payload of each cell is to be read out of the cell buffer and transmitted is managed, and payloads are read out of the cell buffer at the readout timings. As a result, even if cells do not arrive correctly at intervals of 125 μs owing to fluctuation within an ATM switch, the cells are buffered temporarily, after which they can be read out of the cell buffer at intervals of 125 μs in correct fashion. In other words, according to the present invention, cell fluctuation in an ATM network can be compensated for so that it is possible to satisfy the need for a bit rate of 64 Kbps in an STM network.

Further, in accordance with the present invention, the correct readout timing of each cell is managed even if the order of cell arrival is reversed for some reason. This makes it possible to eliminate the effects of the reversal phenomenon and to restore the normal state. In addition, cells can be transmitted with the cell interval of cells having the same cell number being kept at the correct 125 μs (i.e., with the cells being transmitted at the speed of 64 Kbps).

In accordance with the present invention, a PVC having a prescribed bandwidth is established beforehand between STM switches, traffic between the STM switches is monitored and the PVC bandwidth is adjusted in dependence upon the traffic between STM switches. As a result, an ATM terminal will no longer use the entire bandwidth of an ATM switch. This makes it possible to prevent, to the greatest extent possible, a situation in which a CBR path fails to be established between STM switches. Further, it is so arranged that dedicated bandwidth (PVC bandwidth) is varied dynamically in dependence upon the traffic between STM switches, e.g., the traffic between STM switches in one day, thereby making it possible to minimize wasting of bandwidth.

In accordance with the present invention, a call is accepted in response to a call set-up request from an STM switch if PVC bandwidth has enough margin. If the PVC bandwidth has insufficient margin, bandwidth other than the PVC bandwidth is checked for surplus bandwidth. If surplus bandwidth is found, the call is accepted; otherwise, the call is refused. This makes it possible to maintain QOS while assuring establishment of a connection, to some extent, between STM switches.

As many apparently widely different embodiments of the present invention can be made without departing from the spirit and scope thereof, it is to be understood that the invention is not limited to the specific embodiments thereof except as defined in the appended claims.

What is claimed is:

1. A converting circuit for converting a time division multiplexed frame of an STM network, said frame is the result of time division multiplexing n channels in one frame and one byte of data in each channel, to cells of an ATM network, each cell having a header and an m-byte payload, comprising:

a time switch memory having, for each destination STM switch, a storage area possessing m consecutive addresses;

a control memory for storing a corresponding relationship between time slot numbers in a time division multiplexed frame and addresses of the time switch memory;

writing means for writing data of each time slot in the time division multiplexed frame to a storage area of said time switch memory that is specified by the corresponding relationship stored in said control memory;

a buffer memory for storing data read out of said time switch memory;

reading means for reading data out of said time switch memory successively, storing the data in said buffer memory and reading the data out of said buffer memory successively in m-byte units; and cell generating means for generating a cell in which m bytes of consecutive data read out of said buffer memory is adopted as a payload and a header having an identifier conforming to a destination STM switch is added onto the payload.

2. The circuit according to claim 1, wherein in a case where a number of items of data to be sent to a certain destination STM switch exceeds m bytes, said time switch memory has a plurality of successive m-address storage areas for said destination STM switch;

said writing means writes the data, which is to be sent to said destination STM switch, to the plurality of m-address storage areas; and said cell generating means generates cells by adopting each of m-byte data items, which have been read out of the plurality of m-address storage areas of said time switch memory, as said payload, adding a header, which has an identifier conforming to the destination STM switch, onto the payload and adding a cell number for cell identification onto the header or the payload.

3. A converting circuit for converting a time division multiplexed frame of an STM network, said frame is the result of time division multiplexing n channels in one frame and one byte of data in each channel, to cells of an ATM network, each cell having a header and an m-byte payload, comprising:

a destination memory for storing correspondence between time slot numbers of the time division multiplexed frame and STM switches that are destinations;

a destination add-on unit for adding, onto data in the time slots of the time division multiplexed frame, the destinations of the corresponding time slots that have been stored in said destination memory;

a routing unit, to which the time division multiplexed frame having the added-on destinations is input, for disassembling the data of the frame on a per-address basis and outputting the disassembled data;

a buffer, which is provided for each destination, for storing the disassembled data output by said routing unit; and cell generating means for generating a cell in which m-byte data read out of each buffer in consecutive fashion is adopted as a payload and a header having an identifier conforming to a destination is added onto the payload.

4. A converting circuit for converting ATM network cells each having a header and an m-byte payload to time division multiplexed frames of an STM network, wherein one frame is composed of n channels and each channel is composed of one byte data, comprising:

a buffer for storing m bytes of payload data, which construct the payload of a received cell, in such a manner that a cell number and a payload number are identified;

a time switch memory in which time slot numbers serve as addresses;

a control memory for storing correspondence between combinations of cell numbers and payload numbers and addresses of said time switch memory;

writing means for identifying a cell number and a payload number of payload data that has been read out of said buffer, obtaining from said control memory an address that corresponds to a combination of the identified cell number and payload number and writing said payload data to a storage area of said time switch memory that is specified by said address; and means for reading data out of said time switch memory consecutively in the order of the time slot numbers and converting the data to a time division multiplexed frame.

5. The circuit according to claim 4, wherein payload data of a plurality of received cells can be stored in said buffer, readout timing management means is provided for managing timing at which the payload data of each cell is read out of said buffer, and the payload data of each cell is read out of said buffer at the readout timing.

6. An apparatus for managing bandwidth of an ATM switch in a mixed network of STM and ATM networks, comprising:

means for establishing a PVC of a prescribed bandwidth between a plurality of STM switches in advance;

means for monitoring traffic between the STM switches; and

PVC bandwidth adjusting means for adjusting the bandwidth of the PVC in dependence upon the traffic between the STM switches; and means for accepting a call in response to a call establishment request from an STM switch if the PVC bandwidth has enough margin, checking bandwidth other than the PVC bandwidth to determine whether there is surplus bandwidth if the PVC bandwidth has insufficient margin, accepting the call if the bandwidth other than the PVC bandwidth has surplus bandwidth and refusing the call if the bandwidth other than the PVC bandwidth has no surplus bandwidth.

* * * * *